United States Patent [19]

Yamada et al.

[11] Patent Number: 5,920,160

[45] Date of Patent: *Jul. 6, 1999

[54] POWER OUTPUT APPARATUS AND METHOD OF CONTROLLING THE SAME

[75] Inventors: Eiji Yamada, Owariasahi; Takao Miyatani, Toyota; Yasutomo Kawabata, Aichi-ken, all of Japan

[73] Assignee: Toyota Jidosha Kabushiki Kaisha, Toyota, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/636,807

[22] Filed: Apr. 23, 1996

[30] Foreign Application Priority Data

May 19, 1995 [JP] Japan .................................... 7-145575
Sep. 4, 1995 [JP] Japan .................................... 7-251944

[51] Int. Cl.$^6$ ................................ H02K 7/10; B60K 1/00
[52] U.S. Cl. ................................ 318/9; 318/50; 318/87; 180/65.2; 180/65.4; 477/8; 477/179
[58] Field of Search ................................ 180/65.1, 65.2, 180/65.3, 270, 65.4; 364/424.1, 424.026, 426, 431; 475/76, 107, 113, 104, 91; 477/5, 7–9, 15, 20, 30, 179; 74/845, 730, 661, 655 AB; 318/432–434, 9, 11, 376, 379, 381, 366, 49–50, 78, 77, 79, 76, 89, 87, 85

[56] References Cited

U.S. PATENT DOCUMENTS

| | | |
|---|---|---|
| 3,683,249 | 8/1972 | Shibata . |
| 3,789,281 | 1/1974 | Shibata . |
| 3,866,703 | 2/1975 | Eastham ................................ 180/65.1 |
| 4,309,620 | 1/1982 | Heidemeyer et al. .................. 180/65.2 |
| 4,335,429 | 6/1982 | Kawakatsu ............................. 180/65.2 |
| 4,533,011 | 8/1985 | Bock ..................................... 180/65.2 |
| 4,699,097 | 10/1987 | Tanaka et al. . |
| 5,085,101 | 2/1992 | Oldfield ................................ 74/730.1 |
| 5,498,216 | 3/1996 | Bitsche et al. ........................... 477/20 |
| 5,501,641 | 3/1996 | Kollermeyer et al. .................. 475/107 |
| 5,635,805 | 6/1997 | Ibaraki et al. ........................... 318/139 |
| 5,637,987 | 6/1997 | Fattic et al. ............................. 180/65.3 |
| 5,644,200 | 7/1997 | Yang ........................................ 318/139 |
| 5,720,690 | 2/1998 | Hara et al. ............................... 180/65.2 |

FOREIGN PATENT DOCUMENTS

| | | |
|---|---|---|
| 58401/73 | 1/1975 | Australia . |
| 0 338 485 B1 | 10/1989 | European Pat. Off. . |
| 0 354 790 A2 | 2/1990 | European Pat. Off. . |
| 0 604 979 A2 | 6/1994 | European Pat. Off. . |
| 0 725 474 | 8/1996 | European Pat. Off. . |
| 0 781 680 A2 | 7/1997 | European Pat. Off. . |
| 195 32 128 A1 | 3/1997 | Germany . |
| 49-43311 | 4/1974 | Japan . |
| 51-22132 | 7/1976 | Japan . |
| 53-133814 | 11/1978 | Japan . |
| 55-103100 | 6/1980 | Japan . |
| 61-155635 | 7/1986 | Japan . |

*Primary Examiner*—John W. Cabeca
*Attorney, Agent, or Firm*—Oliff & Berridge PLC

[57] ABSTRACT

A power output apparatus (20) of the present invention includes an engine (50), a clutch motor (30) connecting with a crankshaft (56) of the engine (50), an assist motor (40) connecting with a drive shaft (22), and a controller (80) for controlling the clutch motor (30) and the assist motor (40). In order to attain stable driving of the engine (50) at a target engine torque and a target engine speed, the engine (50) is feedback controlled with the torque of the clutch motor (30). In the feedback control, a range of scatter of the revolving speed of the crankshaft (56) (that is, a variation in rotation or pulsating torque) due to the pulsating power output from the engine (50) is set as a dead zone. The torque of the clutch motor (30) is accordingly not varied with the variation in rotation of the crankshaft 56 (pulsating torque). This structure effectively prevents the variation in rotation (pulsating torque) from being transmitted to the drive shaft (22).

9 Claims, 18 Drawing Sheets

TORQUE Te OF
ENGINE 50

REVOLVING SPEED
Ne OF ENGINE 50

POWER OUTPUT APPARATUS AND METHOD OF CONTROLLING THE SAME

BACKGROUND OF THE INVENTION

1. Field of the Invention

The present invention relates, in general, to a power output apparatus and a method of controlling the same. More specifically, the invention pertains to a power output apparatus for outputting or utilizing power generated by an engine at a high efficiency and a method of controlling such a power output apparatus.

2. Description of the Related Art

In known power output apparatuses for outputting power generated by an engine to a drive shaft, torque converters utilizing a fluid are generally used to convert the power of the engine to a torque transmitted to the drive shaft. In the conventional fluid-based torque converters, an input shaft and an output shaft are not fully locked with each other and there is accordingly an energy loss corresponding to a slip occurring between the input shaft and the output shaft. The energy loss, which is consumed as a heat, is expressed as the product of the revolving speed difference between the input shaft and the output shaft and the torque transmitted at that time. In vehicles with such a power output apparatus mounted thereon, a large energy loss occurs in a transient state like a starting time. The energy efficiency is not 100% even in a stationary driving state. Compared with manual transmissions, the torque converters lead to a lower fuel consumption.

Power output apparatuses for outputting power through mechanical-electrical-mechanical conversion have been proposed to overcome such a drawback (for example, 'ARRANGEMENT OF ROTARY POWER-DRIVEN MACHINES' disclosed in JAPANESE PATENT PUBLICATION GAZETTE No. 51-22132). This proposed system connects power generated by an engine with power transmission means including an electromagnetic coupling and a revolving armature, and realizes a reduction ratio (torque conversion ratio) of 1+P2/P1, wherein P1 represents a number of poles of the revolving armature and P2 represents a number of poles of the electromagnetic coupling. Unlike the conventional fluid-based torque converters, this proposed structure substantially has no energy loss due to the slip. It is accordingly possible to make the energy loss in the power transmission means relatively small by enhancing the efficiencies of the electromagnetic coupling and the revolving armature.

The proposed power output apparatus for outputting power through mechanical-electrical-mechanical conversion, however, has a fixed torque conversion ratio and is thus not applicable to the systems requiring a wide variation in torque conversion ratio, such as vehicles. It is difficult to realize a desired torque conversion ratio according to the driving conditions of the vehicle and the engine. As discussed above, power output apparatuses utilizing a liquid can not be free from an energy loss corresponding to a slip occurring between the input shaft and the output shaft.

In engines which rotate the output shaft by pulsating power, for example, internal combustion engines which generate mechanical energy through a cycle of ingestion, compression, combustion, and exhaust, the pulsating power may be output to the drive shaft. When a power output apparatus with such an engine for outputting pulsating power is mounted on a vehicle, the pulsating power output to the drive shaft undesirably vibrates the vehicle itself or the other equipment mounted on the vehicle.

Some apparatuses have been proposed to depress the pulsation of a transmitted torque in the engine rotating the output shaft by its pulsating power. An example of such apparatus is provided with a motor using a flywheel attached to a crankshaft or output shaft of the engine as its rotor, as disclosed in JAPANESE PATENT LAYING-OPEN GAZETTE No. 61-155635. This system enables a torque having an inverted phase to that of the pulsating torque transmitted to the crankshaft to be applied from the motor to the crankshaft via the flywheel, thereby reducing the pulsation of the torque. In this system, however, the flywheel directly attached to the crankshaft of the engine, which is the source of torque pulsation, is used to reduce the torque pulsation. This results in a rather small attenuation of the pulsating component (that is, rather small smoothing effect) and requires a large torque to compensate for the pulsating component.

The pulsation of power affects the behavior of the object to be controlled in the process of controlling operation of the engine or controlling the power transmission means. The minute control detects the behavior due to the power pulsation and thereby implements the unrequired control based on the detected behavior.

SUMMARY OF THE INVENTION

One object of the present invention is thus to output power generated by an engine to a drive shaft at a high efficiency or alternatively utilize the power at a high efficiency, in order to output a torque in the direction of rotation of the output shaft of the engine.

Another object of the present invention is to cancel a pulsating component of the power output from the engine, which rotates the output shaft by its pulsating power.

The above and the other related objects of the present invention are realized at least paertly by a first power output apparatus for outputting power to a drive shaft. The first power output apparatus comprises: an engine having an output shaft, the engine rotating the output shaft by pulsating power thereof; target state determination means for setting a target state of the output shaft of the engine; engine control means for controlling operation of the engine, in order to make the output shaft of the engine reach the target state set by the target state determination means; output shaft condition measuring means for measuring condition of the output shaft of the engine; a clutch motor comprising a first rotor connected with the output shaft of the engine and a second rotor connected with the drive shaft, the second rotor being coaxial to and rotatable relative to the first rotor, the first and second rotors being electromagnetically connected with each other, whereby power is transmitted between the output shaft of the engine and the drive shaft via the electromagnetic connection of the first and second rotors; and clutch motor control means for controlling a degree of electromagnetic connection of the first rotor and the second rotor in the clutch motor and regulating the rotation of the second rotor relative to the first rotor, in order to enable the condition of the output shaft of the engine measured by the output shaft condition measuring means to be within a predetermined range as a dead zone including the target state set by the target state determination means.

The first power output apparatus of the invention can reduce the pulsating component of power generated by the engine and output the power with no or reduced pulsation to the drive shaft. When the condition of the output shaft of the engine is within the predetermined range including the target state, the clutch motor control means is not activated to make the condition of the output shaft of the engine reach the target state. This implies that the predetermined range is a dead zone. Even when the pulsating component of power generated by the engine varies the condition of the output shaft of the engine, as long as the variation is within the predetermined range including the target state, the clutch motor control means does not vary the degree of electromagnetic coupling of the first rotor with the second rotor in the clutch motor. The pulsating component of power is accordingly not output to the drive shaft. When the predetermined range is narrower than the range of varied condition of the output shaft of the engine due to the pulsation of power, the power with reduced pulsation is output to the drive shaft.

In accordance with one aspect of the first power output apparatus, the predetermined range is a predetermined first range; and the clutch motor control means comprises means for controlling the clutch motor to enable the condition of the output shaft of the engine to be within the predetermined first range, while the condition of the output shaft of the engine measured by the output shaft condition measuring means is within a predetermined second range including the predetermined first range.

In accordance with another aspect of the first power output apparatus, the condition of the output shaft of the engine is varied by the pulsating power of the engine within the predetermined range, when the engine control means controls the operation of the engine to enable the condition of the output shaft to reach the target state set by the target state determination means.

In accordance with still another aspect of the first power output apparatus, the condition of the output shaft of the engine is a change of revolving speed of the output shaft.

In accordance with further another aspect of the first power output apparatus, the condition of the output shaft of the engine is an output condition of a torque to the output shaft of the engine.

In accordance with another aspect of the first power output apparatus, the condition of the output shaft of the engine is a difference between a revolving speed of the output shaft of the engine and a revolving speed of the drive shaft.

In accordance with one aspect of the present invention, a second power output apparatus for outputting power to a drive shaft comprises: an engine having an output shaft, the engine rotating the output shaft by pulsating power thereof; target state determination means for setting a target state of the output shaft of the engine; engine control means for controlling operation of the engine, in order to make the output shaft of the engine reach the target state set by the target state determination means; output shaft condition measuring means for measuring condition of the output shaft of the engine; a clutch motor comprising a first rotor connected with the output shaft of the engine and a second rotor connected with the drive shaft, the second rotor being coaxial to and rotatable relative to the first rotor, the first and second rotors being electromagnetically connected with each other, whereby power is transmitted between the output shaft of the engine and the drive shaft via the electromagnetic connection of the first and second rotors; clutch motor control means for controlling a degree of electromagnetic connection of the first rotor and the second rotor in the clutch motor and regulating the rotation of the second rotor relative to the first rotor, in order to enable the condition of the output shaft of the engine measured by the output shaft condition measuring means to reach the target state set by the target state determination means; an assist motor connecting with the drive shaft; and assist motor control means for controlling the assist motor to cancel a pulsating component of the power transmitted to the drive shaft by the clutch motor.

In accordance with one aspect of second power output apparatus, the assist motor control means further comprises: pulsating component measuring means for measuring the pulsating component of the power transmitted to the drive shaft; and pulsating component reduction means for controlling the assist motor to cancel the pulsating component measured by the pulsating component measuring means. In this structure, the pulsating component measuring means may comprise means for measuring the pulsating component of the power, based on the degree of electromagnetic connection of the first rotor and the second rotor controlled by the clutch motor control means, or the pulsating component measuring means may comprise means for measuring the pulsating component of the power, based on the condition of the output shaft of the engine measured by the output shaft condition measuring means. The pulsating component reduction means may comprise means for controlling the assist motor to enable the assist motor to add specific power to the drive shaft, the specific power having the same magnitude as that of the pulsating component of the power transmitted to the drive shaft but having a phase difference of half the cycle of the pulsating component.

In accordance with one aspect of second power output apparatus, the assist motor control means further comprises: pulsating component measuring means for measuring the pulsating component of the power transmitted to the drive shaft; frequency calculating means for computing a frequency of the pulsating component of the power measured by the pulsating component measuring means; sine wave power applying means for successively regulating an amplitude and a phase of sine wave power at the frequency computed by the frequency calculating means, and enabling the assist motor to successively apply the sine wave power with the regulated amplitude and phase to the drive shaft; and additional power setting means for extracting optimal sine wave power with an optimal amplitude and an optimal phase, which reduces the pulsating component of the power measured by the pulsating component measuring means, from the sine wave power successively applied by the sine wave power applying means, and setting additional power applied by the assist motor to the drive shaft. In this structure, the pulsating component measuring means may comprise means for measuring the pulsating component of the power, based on a rotating condition of the drive shaft.

In accordance with another aspect of second power output apparatus, the assist motor control means further comprises: pulsating component measuring means for measuring the pulsating component of the power transmitted to the drive shaft; frequency calculating means for computing a frequency of the pulsating component of the power transmitted to the drive shaft, based on the condition of the output shaft of the engine measured by the output shaft condition measuring means; sine wave power applying means for successively regulating an amplitude and a phase of sine wave power at the frequency computed by the frequency calculating means, and enabling the assist motor to successively apply the sine wave power with the regulated amplitude and phase to the drive shaft; and additional power setting means for extracting optimal sine wave power with an optimal amplitude and an optimal phase, which reduces the pulsating component of the power measured by the pulsating component measuring means, from the sine wave power successively applied by the sine wave power applying means, and setting additional power applied by the assist motor to the drive shaft.

In accordance with still another aspect of second power output apparatus, the condition of the output shaft of the engine is a rotating condition of the output shaft.

In accordance with further another aspect of second power output apparatus, the condition of the output shaft of the engine is an output condition of a torque to the output shaft of the engine.

In accordance with another aspect of second power output apparatus, the condition of the output shaft of the engine is a difference between a revolving speed of the output shaft of the engine and a revolving speed of the second rotor of the clutch motor.

In accordance with another aspect of the present invention, a third power output apparatus for outputting power to a drive shaft comprises: an engine having an output shaft, the engine rotating the output shaft by pulsating power thereof; target state determination means for setting a target state of the output shaft of the engine; engine control means for controlling operation of the engine, in order to make the output shaft of the engine reach the target state set by the target state determination means; output shaft condition measuring means for measuring condition of the output shaft of the engine; a complex motor comprising a first rotor connected with the output shaft of the engine, a second rotor connected with the drive shaft being coaxial to and rotatable relative to the first rotor, and a stator for rotating the second rotor, the first rotor and the second rotor constituting a first motor, the second rotor and the stator constituting a second motor; first motor control means for controlling a degree of electromagnetic connection of the first rotor and the second rotor in the first motor of the complex motor and regulating the rotation of the second rotor relative to the first rotor, in order to enable the condition of the output shaft of the engine measured by the output shaft condition measuring means to be within a predetermined range as a dead zone including the target state set by the id target state determination means; and second motor control means for controlling the second motor in the complex motor.

The third power output apparatus of the invention can output the power with no or at least reduced pulsation to the drive shaft. This structure, in which the first motor is integrally joined with the second motor, can reduce the weight and size of the whole power output apparatus.

In accordance with still another aspect of the present invention, a fourth power output apparatus for outputting power to a drive shaft comprises: an engine having an output shaft, the engine rotating the output shaft by pulsating power thereof; target state determination means for setting a target state of the output shaft of the engine; engine control means for controlling operation of the engine, in order to make the output shaft of the engine reach the target state set by the target state determination means; output shaft condition measuring means for measuring condition of the output shaft of the engine; a complex motor comprising a first rotor connected with the output shaft of the engine, a second rotor connected with the drive shaft being coaxial to and rotatable relative to the first rotor, and a stator for rotating the second rotor, the first rotor and the second rotor constituting a first motor, the second rotor and the stator constituting a second motor; first motor control means for controlling a degree of electromagnetic connection of the first rotor and the second rotor in the first motor of the complex motor and regulating the rotation of the second rotor relative to the first rotor, in order to enable the condition of the output shaft of the engine measured by the output shaft condition measuring means to reach the target state set by the target state determination means; and second motor control means for controlling the second motor of the complex motor to cancel a pulsating component of the power transmitted to the drive shaft by the first motor of the complex motor.

The fourth power output apparatus of the invention can output the power with no or at least reduced pulsation to the drive shaft. This structure, in which the first motor is integrally joined with the second motor, can reduce the weight and size of the whole power output apparatus.

In accordance with another aspect of the present invention, a fifth power output apparatus for outputting power to a drive shaft comprises: an engine having an output shaft, the engine rotating the output shaft by pulsating power thereof; target state determination means for setting a target state of the output shaft of the engine; engine control means for controlling operation of the engine, in order to make the output shaft of the engine reach the target state set by the target state determination means; output shaft condition measuring means for measuring condition of the output shaft of the engine; a complex motor comprising a first rotor connected with the output shaft of the engine, a second rotor connected with the drive shaft being coaxial to and rotatable relative to the first rotor, and a stator for rotating the second rotor, the first rotor and the second rotor constituting a first motor, the first rotor and the stator constituting a second motor; first motor control means for controlling a degree of electromagnetic connection of the first rotor and the second rotor in the first motor of the complex motor and regulating the rotation of the second rotor relative to the first rotor, in order to enable the condition of the output shaft of the engine measured by the output shaft condition measuring means to be within a predetermined range as a dead zone including the target state set by the id target state determination means; and second motor control means for controlling the second motor in the complex motor.

The fifth power output apparatus of the invention can output the power with no or at least reduced pulsation to the drive shaft. This structure, in which the first motor is integrally joined with the second motor, can reduce the weight and size of the whole power output apparatus.

The present invention is directed to a first method of controlling a power output apparatus for outputting power to a drive shaft. The first method comprises the steps of: (a) providing an engine having an output shaft, the engine rotating the output shaft by pulsating power thereof; and a clutch motor comprising a first rotor connected with the output shaft of the engine and a second rotor connected with the drive shaft, the second rotor being coaxial to and rotatable relative to the first rotor, the first and second rotors being electromagnetically connected with each other, whereby power is transmitted between the output shaft of the engine and the drive shaft via the electromagnetic connection of the first and second rotors; (b) setting a target state of the output shaft of the engine; (c) controlling operation of the engine, in order to make the output shaft of the engine reach the target state; (d) measuring condition of the output shaft of the engine; and (e) controlling a degree of electromagnetic connection of the first rotor and the second rotor in the clutch motor, in order to enable the condition of the output shaft of the engine to be within a predetermined range as a dead zone including the target state.

The present invention is further directed to a second method of controlling a power output apparatus for outputting power to a drive shaft. The second method comprises the steps of: (a) providing an engine having an output shaft, the engine rotating the output shaft by pulsating power thereof; a clutch motor comprising a first rotor connected with the output shaft of the engine and a second rotor connected with the drive shaft, the second rotor being coaxial to and rotatable relative to the first rotor, the first and second rotors being electromagnetically connected with each other, whereby power is transmitted between the output shaft of the engine and the drive shaft via the electromagnetic connection of the first and second rotors; and an assist motor connected with the drive shaft; (b) setting a target state of the output shaft of the engine; (c) controlling operation of the engine, in order to make the output shaft of the engine reach the target state; (d) measuring condition of the output shaft of the engine; (e) controlling a degree of electromagnetic connection of the first rotor with the second rotor in the clutch motor, in order to enable the condition of the output shaft of the engine to reach the target state; and (f) controlling the assist motor to cancel a pulsating component of the power transmitted to the drive shaft by the clutch motor.

These and other objects, features, aspects, and advantages of the present invention will become more apparent from the following detailed description of the preferred embodiments with the accompanying drawings.

DETAILED DESCRIPTION OF THE PREFERRED EMBODIMENTS

Figure 1:
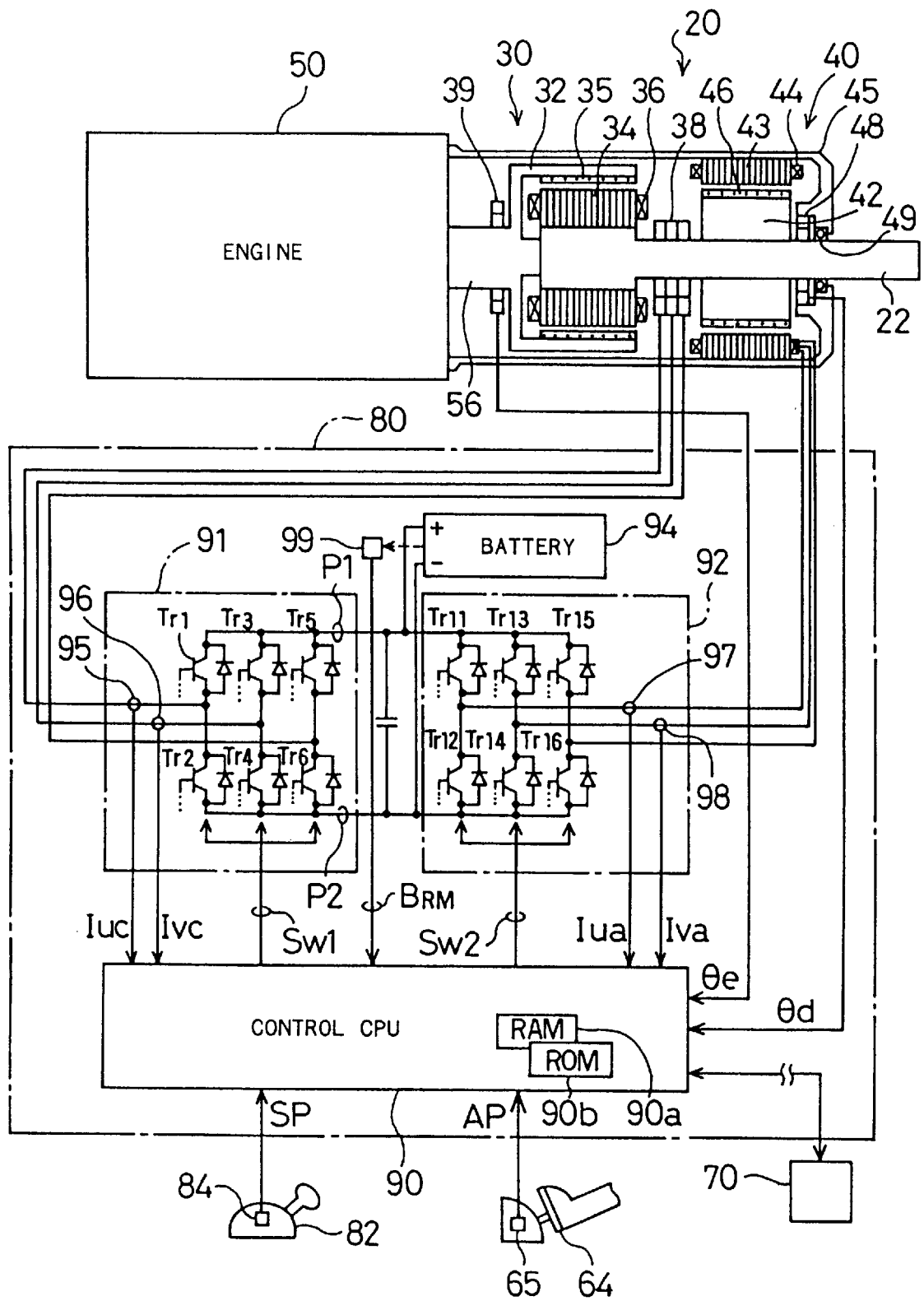
FIG. 1 schematically illustrates structure of a power output apparatus 20 as a first embodiment according to the present invention.
Figure 2:
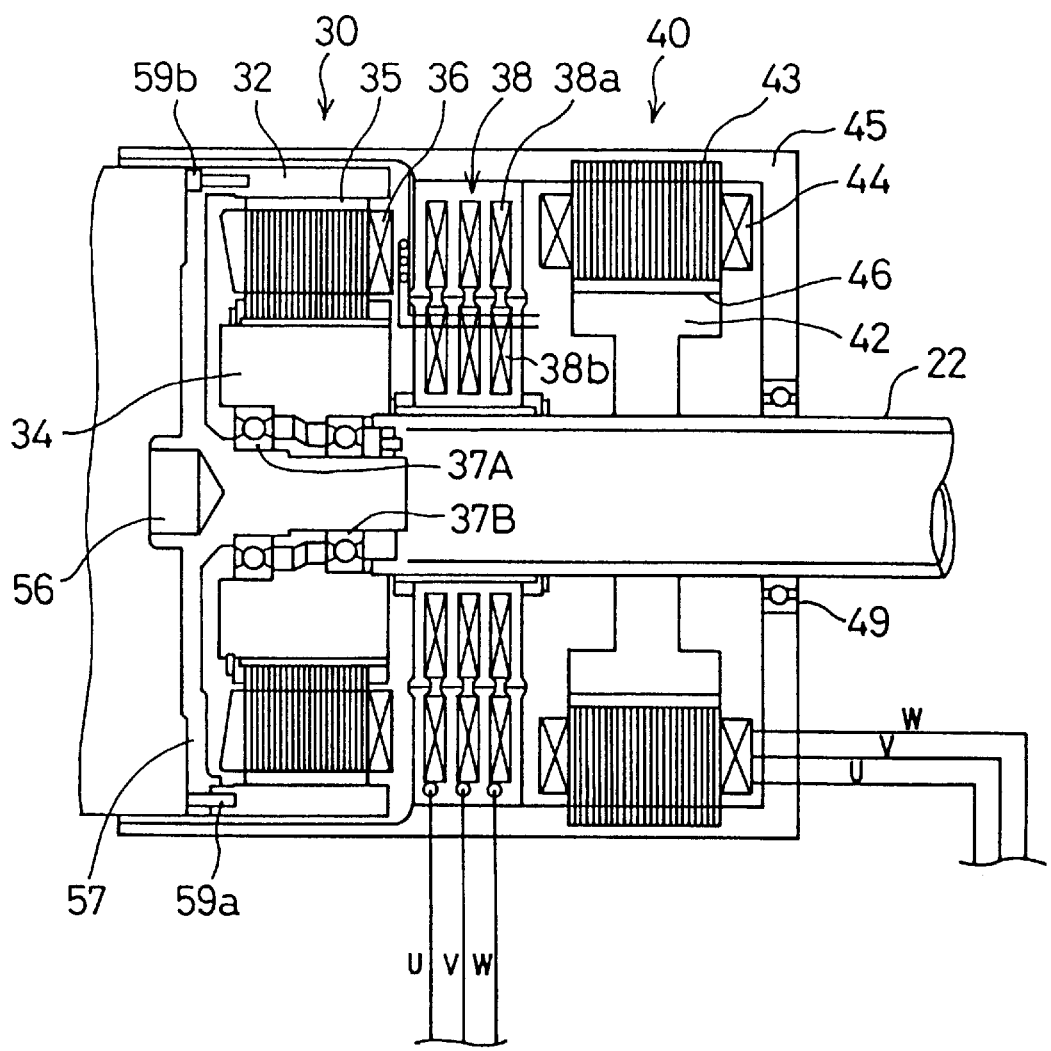
FIG. 2 is a cross sectional view illustrating detailed structures of a clutch motor 30 and an assist motor 40 included in the power output apparatus 20 of FIG. 1.
Figure 3:
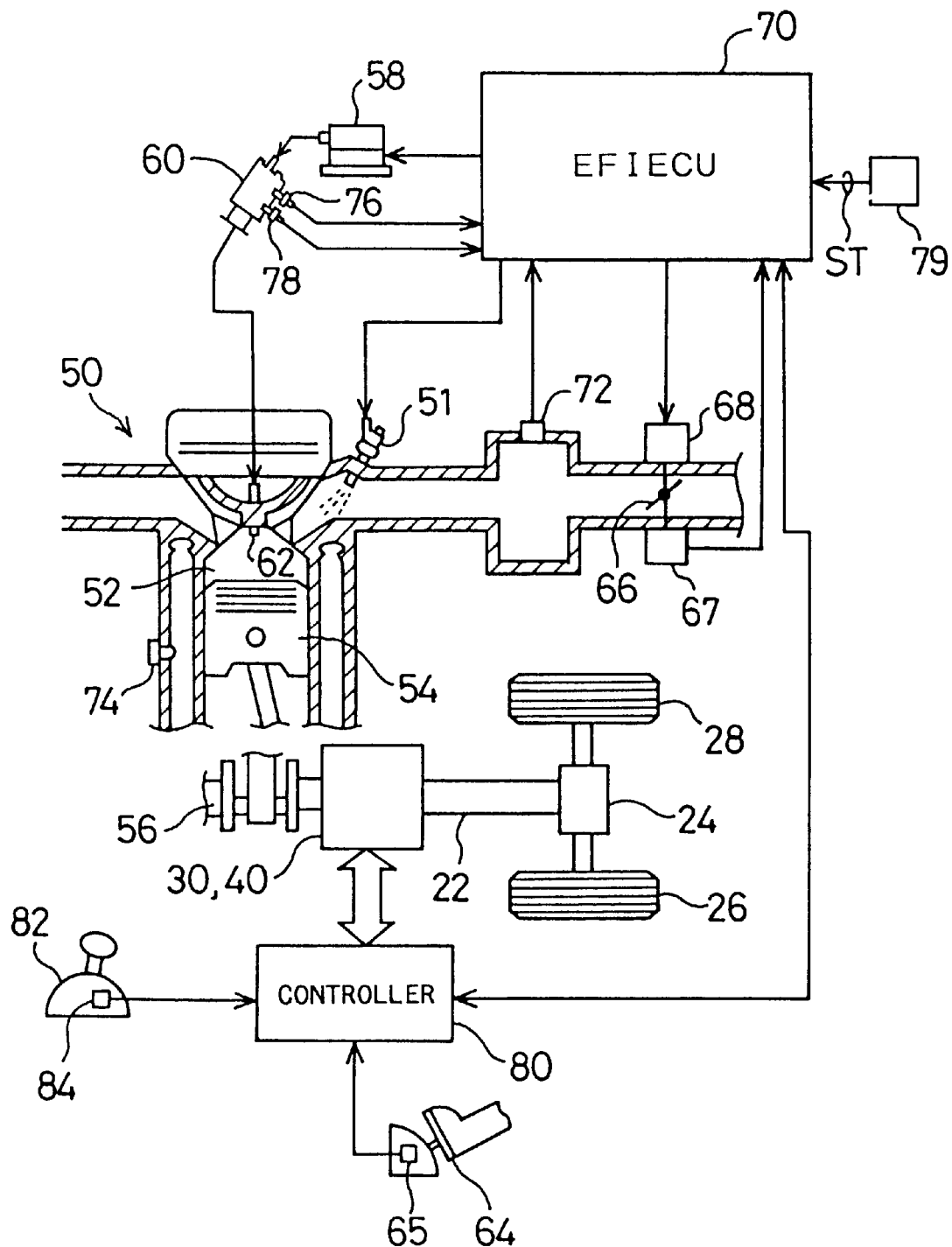
FIG. 3 is a schematic view illustrating general structure of a vehicle with the power output apparatus 20 of FIG. 1 incorporated therein.

FIG. 1 is a schematic view illustrating structure of a power output apparatus 20 as a first embodiment according to the present invention; FIG. 2 is a cross sectional view illustrating detailed structures of a clutch motor 30 and an assist motor 40 included in the power output apparatus 20 of FIG. 1; and FIG. 3 is a schematic view illustrating general structure of a vehicle with the power output apparatus 20 of FIG. 1 incorporated therein. The general structure of the vehicle is described first as a matter of convenience.

Referring to FIG. 3, the vehicle is provided with an engine 50 driven by gasoline as a power source. The air ingested from an air supply system via a throttle valve 66 is mixed with fuel, that is, gasoline in this embodiment, injected from a fuel injection valve 51. The air/fuel mixture is supplied into a combustion chamber 52 to be explosively ignited and burned. Linear motion of a piston 54 pressed down by the explosion of the air/fuel mixture is converted to rotational motion of a crankshaft 56. The throttle valve 66 is driven to open and close by an actuator 68. An ignition plug 62 converts a high voltage applied from an igniter 58 via a distributor 60 to a spark, which explosively ignites and combusts the air/fuel mixture.

Operation of the engine 50 is controlled by an electronic control unit (hereinafter referred to as EFIECU) 70. The EFIECU 70 receives information from various sensors, which detect operating conditions of the engine 50. These sensors include a throttle position sensor 67 for detecting the valve travel or the position of the throttle valve 66, a manifold vacuum sensor 72 for measuring a load applied to the engine 50, a water temperature sensor 74 for measuring the temperature of cooling water in the engine 50, and a speed sensor 76 and an angle sensor 78 mounted on the distributor 60 for measuring the revolving speed and rotational angle of the crankshaft 56. A starter switch 79 for detecting a starting condition ST of an ignition key (not shown) is also connected to the EFIECU 70. Other sensors and switches connecting with the EFIECU 70 are omitted from the drawings.

The crankshaft 56 of the engine 50 is linked with a drive shaft 22 via a clutch motor 30 and an assist motor 40 (described later in detail). The drive shaft 22 further connects with a differential gear 24, which eventually transmits the torque output from the drive shaft 22 of the power output apparatus 20 to left and right driving wheels 26 and 28. The clutch motor 30 and the assist motor 40 are driven and controlled by a controller 80. The controller 80 includes an internal control CPU and receives inputs from a gearshift position sensor 84 attached to a gearshift 82 and an accelerator position sensor 65 attached to an accelerator pedal 64, as described later in detail. The controller 80 sends and receives a variety of data and information to and from the EFIECU 70 through communication. Details of the control procedure including a communication protocol will be described later.

Referring to FIG. 1, the power output apparatus 20 essentially includes the engine 50, the clutch motor 30 with an outer rotor 32 and an inner rotor 34, the assist motor 40 with a rotor 42, and the controller 80 for driving and controlling the clutch motor 30 and the assist motor 40. The outer rotor 32 of the clutch motor 30 is mechanically connected to one end of the crankshaft 56 of the engine 50, whereas the inner rotor 34 thereof is mechanically linked with the rotor 42 of the assist motor 40.

As shown in FIG. 1, the clutch motor 30 is constructed as a synchronous motor having permanent magnets 35 attached to an inner surface of the outer rotor 32 and three-phase coils 36 wound on slots formed in the inner rotor 34. Power is supplied to the three-phase coils 36 via a rotary transformer 38. A thin laminated sheet of non-directional electromagnetic steel is used to form teeth and slots for the three-phase coils 36 in the inner rotor 34. A resolver 39 for measuring a rotational angle Oe of the crankshaft 56 is attached to the crankshaft 56. The resolver 39 may also serve as the angle sensor 78 mounted on the distributor 60.

The assist motor 40 is also constructed as a synchronous motor having three-phase coils 44, which are wound on a stator 43 fixed to a casing 45 to generate a rotating magnetic field. The stator 43 is also made of a thin laminated sheet of non-directional electromagnetic steel. A plurality of permanent magnets 46 are attached to an outer surface of the rotor 42. In the assist motor 40, interaction between a magnetic field formed by the permanent magnets 46 and a rotating magnetic field formed by the three-phase coils 44 leads to rotation of the rotor 42. The rotor 42 is mechanically linked with the drive shaft 22 working as the torque output shaft of the power output apparatus 20. A resolver 48 for measuring a rotational angle θd of the drive shaft 22 is attached to the drive shaft 22, which is further supported by a bearing 49 held in the casing 45.

The inner rotor 34 of the clutch motor 30 is mechanically linked with the rotor 42 of the assist motor 40 and further with the drive shaft 22. When the rotation and axial torque of the crankshaft 56 of the engine 50 are transmitted via the outer rotor 32 to the inner rotor 34 of the clutch motor 30, the rotation and torque by the assist motor 40 are added to or subtracted from the transmitted rotation and torque.

While the assist motor 40 is constructed as a conventional permanent magnet-type three-phase synchronous motor, the clutch motor 30 includes two rotating elements or rotors, that is, the outer rotor 32 with the permanent magnets 35 and the inner rotor 34 with the three-phase coils 36. The detailed structure of the clutch motor 30 is described with the cross sectional view of FIG. 2. The outer rotor 32 of the clutch motor 30 is attached to a circumferential end of a wheel 57 set around the crankshaft 56, by means of a pressure pin 59a and a screw 59b. A central portion of the wheel 57 is protruded to form a shaft-like element, to which the inner rotor 34 is rotatably attached by means of bearings 37A and 37B. One end of the drive shaft 22 is fixed to the inner rotor 34.

A plurality of permanent magnets 35, four in this embodiment, are attached to the inner surface of the outer rotor 32 as mentioned previously. The permanent magnets 35 are magnetized in the direction towards the axial center of the clutch motor 30, and have magnetic poles of alternately inverted directions. The three-phase coils 36 of the inner rotor 34 facing to the permanent magnets 35 across a little gap are wound on a total of 24 slots (not shown) formed in the inner rotor 34. Supply of electricity to the respective coils forms magnetic fluxes running through the teeth (not shown), which separate the slots from one another. Supply of a three-phase alternating current to the respective coils rotates this magnetic field. The three-phase coils 36 are connected to receive electric power supplied from the rotary transformer 38. The rotary transformer 38 includes primary windings 38A fixed to the casing 45 and secondary windings 38B attached to the drive shaft 22 coupled with the inner rotor 34. Electromagnetic induction allows electric power to be transmitted from the primary windings 38A to the secondary windings 38B or vice versa. The rotary transformer 38 has windings for three phases, that is, U, V, and W phases, to enable the transmission of three-phase electric currents.

Interaction between a magnetic field formed by one adjacent pair of permanent magnets 35 and a rotating magnetic field formed by the three-phase coils 36 of the inner rotor 34 leads to a variety of behaviors of the outer rotor 32 and the inner rotor 34. The frequency of the three-phase alternating current supplied to the three-phase coils 36 is generally equal to a difference between the revolving speed (revolutions per second) of the outer rotor 32 directly connected to the crankshaft 56 and the revolving speed of the inner rotor 34. This results in a slip between the rotations of the outer rotor 32 and the inner rotor 34. Details of the control procedures of the clutch motor 30 and the assist motor 40 will be described later based on the flowcharts.

As mentioned above, the clutch motor 30 and the assist motor 40 are driven and controlled by the controller 80. Referring back to FIG. 1, the controller 80 includes a first driving circuit 91 for driving the clutch motor 30, a second driving circuit 92 for driving the assist motor 40, a control CPU 90 for controlling both the first and second driving circuits 91 and 92, and a battery 94 including a number of secondary cells. The control CPU 90 is a one-chip microprocessor including a RAM 90a used as a working memory, a ROM 90b in which various control programs are stored, an input/output port (not shown), and a serial communication port (not shown) through which data are sent to and received from the EFIECU 70. The control CPU 90 receives a variety of data through the input/output port. The input data include a rotational angle θe of the crankshaft 56 of the engine 50 from the resolver 39, a rotational angle θd of the drive shaft 22 from the resolver 48, an accelerator pedal position AP (step-on amount of the accelerator pedal 64) from the accelerator position sensor 65, a gearshift position SP from the gearshift position sensor 84, clutch motor currents Iuc and Ivc from two ammeters 95 and 96 in the first driving circuit 91, assist motor currents Iua and Iva from two ammeters 97 and 98 in the second driving circuit 92, and a residual capacity BRM of the battery 94 from a residual capacity meter 99. The residual capacity meter 99 may determine the residual capacity BRM of the battery 94 by any known method; for example, by measuring the specific gravity of an electrolytic solution in the battery 94 or the whole weight of the battery 94, by computing the currents and time of charge and discharge, or by causing an instantaneous short-circuit between terminals of the battery 94 and measuring an internal resistance against the electric current.

The control CPU 90 outputs a first control signal SW1 for driving six transistors Tr1 through Tr6 working as switching elements of the first driving circuit 91 and a second control signal SW2 for driving six transistors Tr11 through Tr16 working as switching elements of the second driving circuit 92. The six transistors Tr1 through Tr6 in the first driving circuit 91 constitute a transistor inverter and are arranged in pairs to work as a source and a drain with respect to a pair of power lines P1 and P2. The three-phase coils (U,V,W) 36 of the clutch motor 30 are connected via the rotary transformer 38 to the respective contacts of the paired transistors. The power lines P1 and P2 are respectively connected to plus and minus terminals of the battery 94. The first control signal SW1 output from the control CPU 90 successively controls the power-on time of the paired transistors Tr1 through Tr6. The electric current flowing through each coil 36 undergoes PWM (pulse width modulation) to give a quasi-sine wave, which enables the three-phase coils 36 to form a rotating magnetic field.

The six transistors Tr11 through Tr16 in the second driving circuit 92 also constitute a transistor inverter and are arranged in the same manner as the transistors Tr1 through Tr6 in the first driving circuit 91. The three-phase coils (U,V,W) 44 of the assist motor 40 are connected to the respective contacts of the paired transistors. The second control signal SW2 output from the control CPU 90 successively controls the power-on time of the paired transistors Tr11 through Tr16. The electric current flowing through each coil 44 undergoes PWM to give a quasi-sine wave, which enables the three-phase coils 44 to form a rotating magnetic field.

The power output apparatus 20 thus constructed works in accordance with the operation principles described below, especially with the principle of torque conversion. By way of example, it is assumed that the engine 50 driven by the EFIECU 70 rotates at a revolving speed Ne equal to a predetermined value N1. While the transistors Tr1 through Tr6 in the first driving circuit 91 are in OFF position, the controller 80 does not supply any current to the three-phase coils 36 of the clutch motor 30 via the rotary transformer 38. No supply of electric current causes the outer rotor 32 of the clutch motor 30 to be electromagnetically disconnected from the inner rotor 34. This results in racing the crankshaft 56 of the engine 50. Under the condition that all the transistors Tr1 through Tr6 are in OFF position, there is no regeneration of energy from the three-phase coils 36, and the engine 50 is kept at an idle.

As the control CPU 90 of the controller 80 outputs the first control signal SW1 to control on and off the transistors Tr1 through Tr6 in the first driving circuit 91, a constant electric current is flown through the three-phase coils 36 of the clutch motor 30, based on the difference between the revolving speed Ne of the crankshaft 56 of the engine 50 and a revolving speed Nd of the drive shaft 22 (that is, difference Nc (=Ne--Nd) between the revolving speed of the outer rotor 32 and that of the inner rotor 34 in the clutch motor 30). A certain slip accordingly exists between the outer rotor 32 and the inner rotor 34 connected with each other in the clutch motor 30. At this moment, the inner rotor 34 rotates at the revolving speed Nd, which is lower than the revolving speed Ne of the crankshaft 56 of the engine 50. In this state, the clutch motor 30 functions as a generator and carries out the regenerative operation to regenerate an electric current via the first driving circuit 91. In order to allow the assist motor 40 to consume energy identical with the electrical energy regenerated by the clutch motor 30, the control CPu 90 controls on and off the transistors Tr11 through Tr16 in the second driving circuit 92. The on-off control of the transistors Tr11 through Tr16 enables an electric current to flow through the three-phase coils 44 of the assist motor 40, and the assist motor 40 consequently carries out the power operation to produce a torque.

Figure 4:
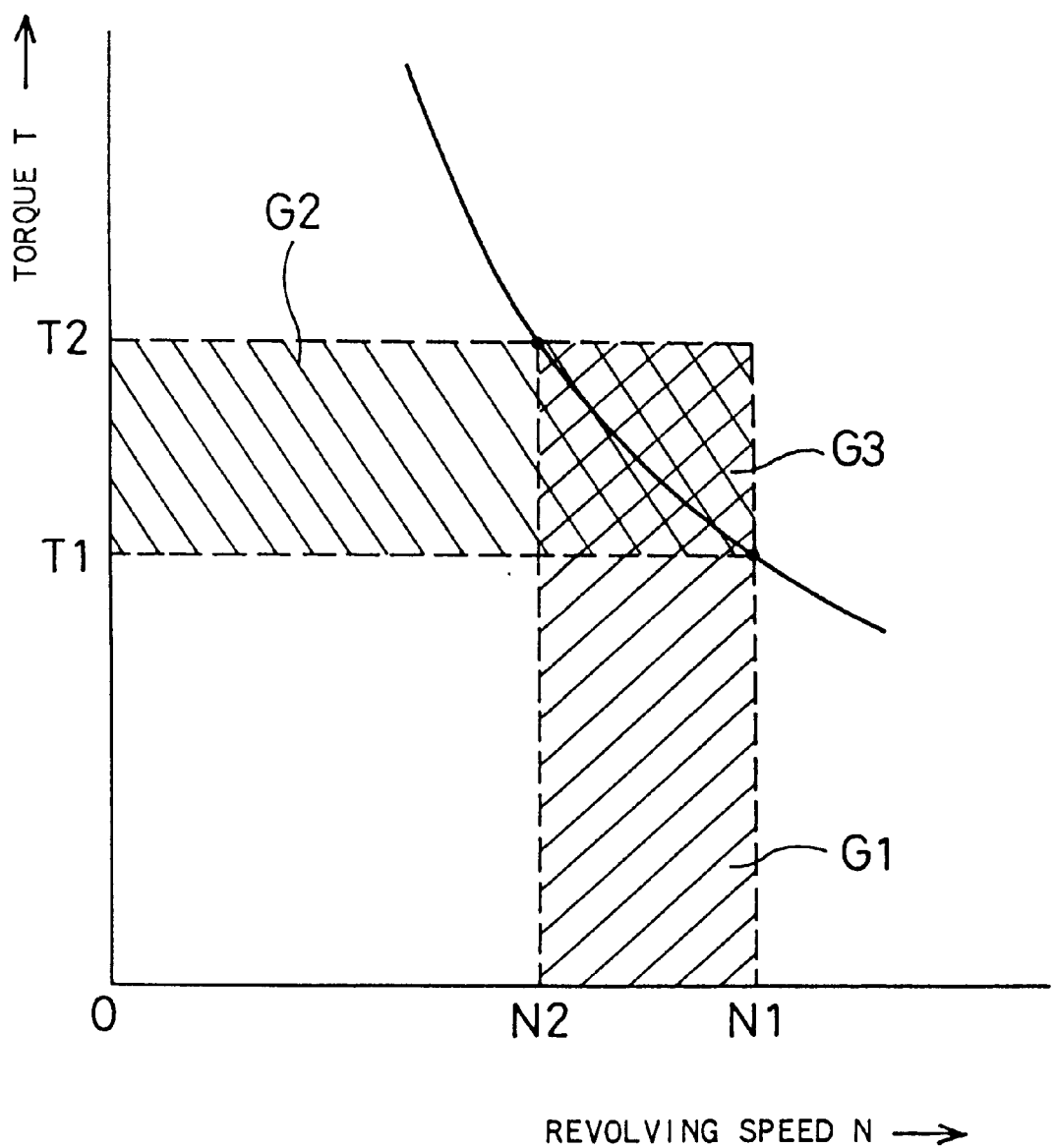
FIG. 4 is a graph showing the operation principle of the power output apparatus 20.

Referring to FIG. 4, while the crankshaft 56 of the engine 50 is driven at a revolving speed N1 and a torque T1, energy in a region G1 is regenerated as electric power by the clutch motor 30. The regenerated power is supplied to the assist motor 40 and converted to energy in a region G2, which enables the drive shaft 22 to rotate at a revolving speed N2 and a torque T2. The torque conversion is carried out in the manner discussed above, and the energy corresponding to the slip in the clutch motor 30 or the revolving speed difference Nc (=Ne–Nd) is consequently given as a torque to the drive shaft 22.

In another example, it is assumed that the engine 50 is driven at a revolving speed Ne=N2 and a torque Te=T2, whereas the drive shaft 22 is rotated at the revolving speed N1, which is greater than the revolving speed N2. In this state, the inner rotor 34 of the clutch motor 30 rotates relative to the outer rotor 32 in the direction of rotation of the drive shaft 22 at a revolving speed defined by the absolute value of the revolving speed difference Nc (=Ne–Nd). While functioning as a normal motor, the clutch motor 30 consumes electric power to apply the energy of rotational motion to the drive shaft 22. When the control CPU 90 of the controller 80 controls the second driving circuit 92 to enable the assist motor 40 to regenerate electrical energy, a slip between the rotor 42 and the stator 43 of the assist motor 40 makes the regenerative current flow through the three-phase coils 44. In order to allow the clutch motor 30 to consume the energy regenerated by the assist motor 40, the control CPU 90 controls both the first driving circuit 91 and the second driving circuit 92. This enables the clutch motor 30 to be driven without using any electric power stored in the battery 94.

Referring back to FIG. 4, when the crankshaft 56 of the engine 50 is driven at the revolving speed N2 and the torque T2, energy in the sum of regions G2 and G3 is regenerated as electric power by the assist motor 40 and supplied to the clutch motor 30. Supply of the regenerated power enables the drive shaft 22 to rotate at the revolving speed N1 and the torque T1.

Other than the torque conversion and revolving speed conversion discussed above, the power output apparatus 20 of the embodiment can charge the battery 94 with an excess of electrical energy or discharge the battery 94 to supplement the electrical energy. This is implemented by controlling the mechanical energy output from the engine 50 (that is, the product of the torque Te and the revolving speed Ne), the electrical energy regenerated or consumed by the clutch motor 30, and the electrical energy regenerated or consumed by the assist motor 40. The output energy from the engine 50 can thus be transmitted as power to the drive shaft 22 at a higher efficiency.

Figure 5:
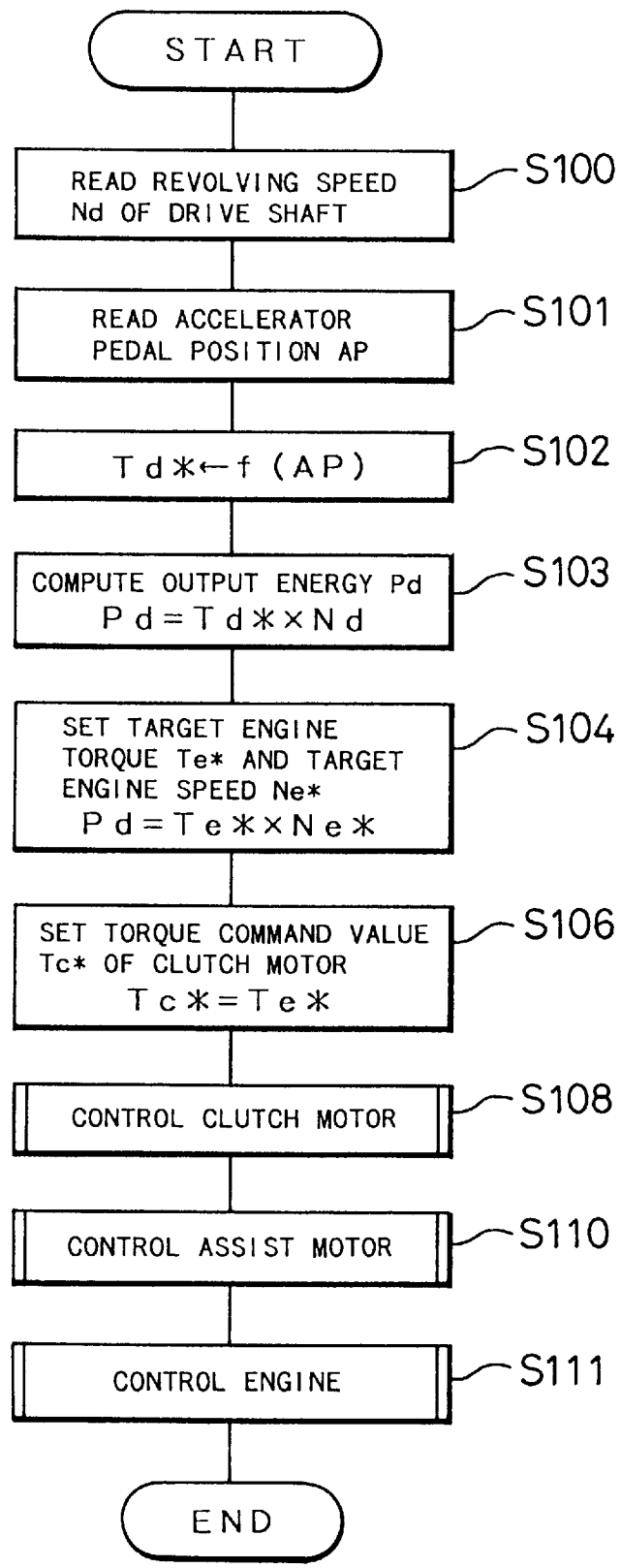
FIG. 5 is a flowchart showing a torque control routine executed by the controller 80 in the first embodiment.

The torque conversion as discussed above is carried out according to the torque control routine illustrated in the flowchart of FIG. 5. When the program enters the torque control routine, the control CPU 90 of the controller 80 first receives data of revolving speed Nd of the drive shaft 22 at step S100. The revolving speed Nd of the drive shaft 22 can be computed from the rotational angle Od of the drive shaft 22 read from the resolver 48. At subsequent step S101, the control CPU 90 reads the accelerator pedal position AP output from the accelerator position sensor 65. The driver steps on the accelerator pedal 64 when feeling insufficiency of output torque. The value of the accelerator pedal position AP accordingly represents the desired output torque (that is, desired torque of the drive shaft 22) which the driver requires. The program then goes to step S102 at which the control CPU 90 computes a target output torque Td* (of the drive shaft 22) corresponding to the input accelerator pedal position AP. The target output torque Td* is also referred to as the output torque command value. Output torque command values Td* have been set previously for the respective accelerator pedal positions AP. In response to an input of the accelerator pedal position AP, the output torque command value Td* corresponding to the input accelerator pedal position AP is extracted from the preset output torque command values Td*.

At step S103, an amount of energy Pd to be output from the drive shaft 22 is calculated according to the expression Pd=Td*xNd, that is, multiplying the extracted output torque command value Td* (of the drive shaft 22) by the input revolving speed Nd of the drive shaft 22. The program then proceeds to step S104 at which the control CPU 90 sets a target engine torque Te* and a target engine speed Ne* of the engine 50 based on the output energy Pd thus obtained. Here it is assumed that all the energy Pd to be output from the drive shaft 22 is supplied by the engine 50. Since the mechanical energy supplied from the engine 50 is equal to the product of the torque Te and the revolving speed Ne of the engine 50, the relationship between the output energy Pd, the target engine torque Te*, and the target engine speed Ne* can be expressed as Pd=Te*xNe*. There are, however, numerous combinations of the target engine torque Te* and the target engine speed Ne* satisfying the above relationship. In this embodiment, an optimal combination of the target engine torque Te* and the target engine speed Ne* is selected in order to realize operation of the engine 50 at the possible highest efficiency.

At subsequent step S106, the control CPU 90 determines a torque command value Tc* of the clutch motor 30 based on the target engine torque Te* set at step S104. In order to keep the revolving speed Ne of the engine 50 at a substantially constant level, it is required to make the torque of the clutch motor 30 balance the torque of the engine 50. The processing at step S106 accordingly sets the torque command value Tc* of the clutch motor 30 equal to the target engine torque Te*.

After setting the torque command value Tc* of the clutch motor 30 at step S106, the program proceeds to steps S108, S110, and S111 to control the clutch motor 30, the assist motor 40, and the engine 50, respectively. As a matter of convenience of illustration, the control operations of the clutch motor 30, the assist motor 40, and the engine 50 are shown as separate steps. In the actual procedure, however, these control operations are carried out comprehensively. For example, the control CPU 90 simultaneously controls the clutch motor 30 and the assist motor 40 by interrupt processing, while transmitting an instruction to the EFIECU 70 through communication to control the engine 50 concurrently.

Figure 6:
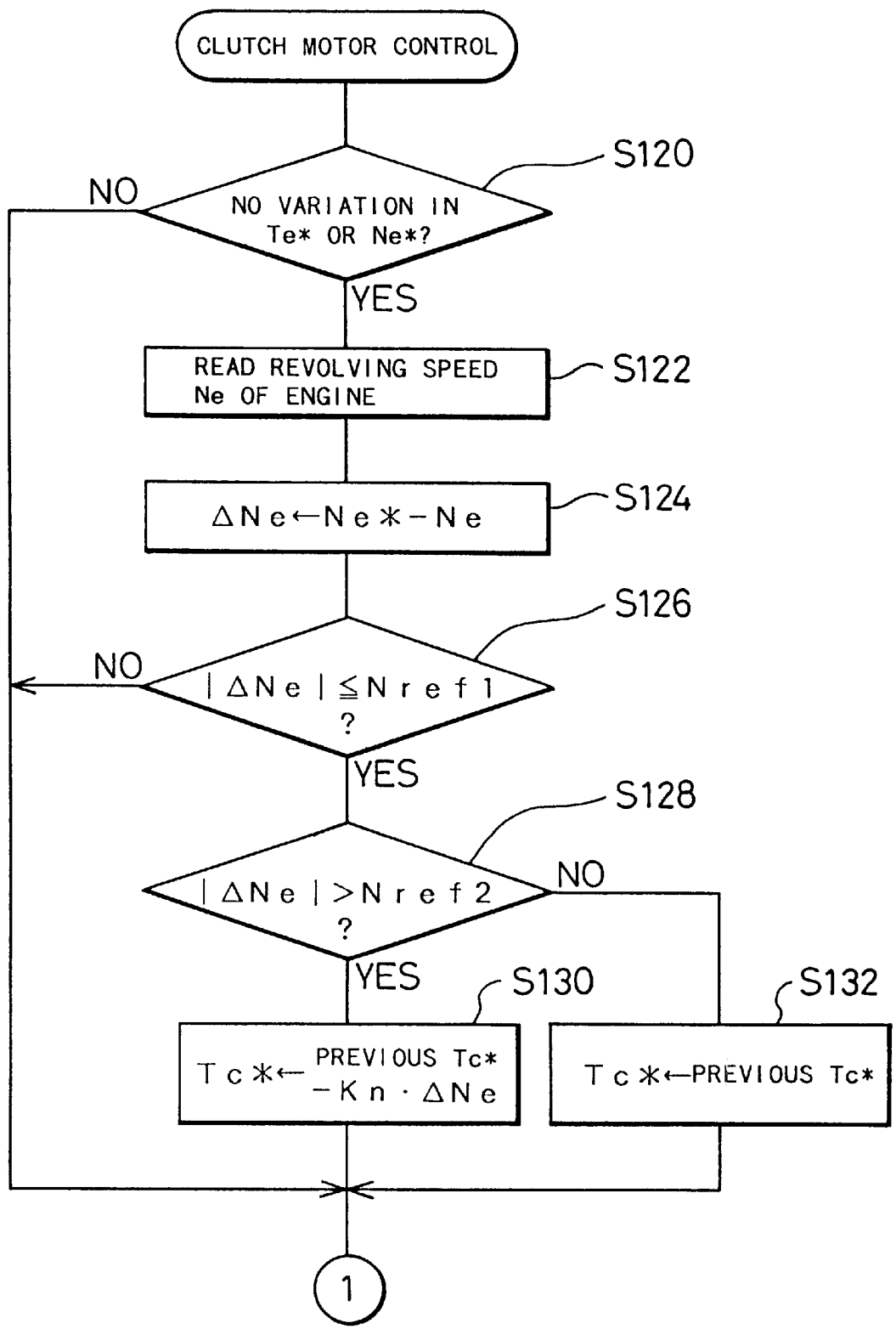
FIGS. 6 and 7 are flowcharts showing details of the control process of the clutch motor 30 executed at step S108 in the flowchart of FIG. 5.
Figure 7:
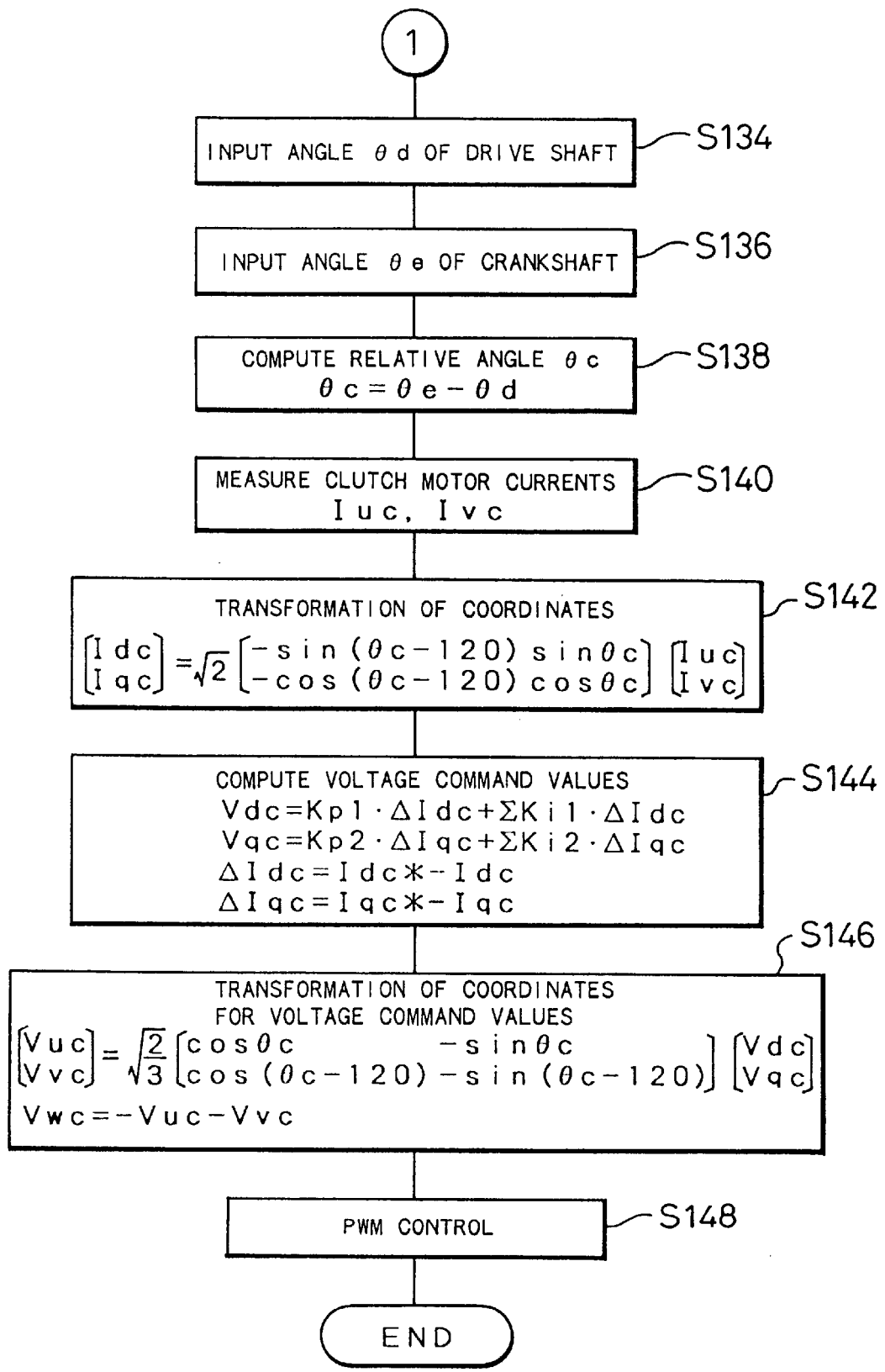

FIGS. 6 and 7 are flowcharts showing details of the control process of the clutch motor 30 executed at step S108 in the flowchart of FIG. 5. When the program enters the clutch motor control routine, the control CPU 90 of the controller 80 first determines whether the target engine torque Te* or the target engine speed Ne* of the engine 50 has been changed from the corresponding data of the previous cycle at step S120. The target engine torque Te* and the target engine speed Ne* are varied with a variation in accelerator pedal position AP (that is, a variation in step-on amount of the accelerator pedal 64 by the driver) or with a variation in driving point of the engine 50 by any other reason. If the driving point of the engine 50 has been changed, the program determines that the target engine torque Te* or the target engine speed Ne* of the engine 50 has been changed from the previous data at step S120, and proceeds to step S134 in the flowchart of FIG. 7.

The control CPU 90 reads the rotational angle θd of the drive shaft 22 from the resolver 48 at step S134 and the rotational angle θe of the crankshaft 56 of the engine 50 from the resolver 39 at step S136. The control CPU 90 then computes a relative angle Oc of the drive shaft 22 and the crankshaft 56 by the equation θc=θe−θd at step S138.

The program proceeds to step S140, at which the control CPU 90 receives inputs of clutch motor currents Iuc and Ivc, which respectively flow through the U phase and V phase of the three-phase coils 36 in the clutch motor 30, from the ammeters 95 and 96. Although the currents naturally flow through all the three phases U, V, and W, measurement is required only for the currents passing through the two phases since the sum of the currents is equal to zero. At subsequent step S142, the control CPU 90 executes transformation of coordinates (three-phase to two-phase transformation) using the values of currents flowing through the three phases obtained at step S140. The transformation of coordinates maps the values of currents flowing through the three phases to the values of currents passing through d and q axes of the permanent magnet-type synchronous motor and is executed according to Equation (1) given below:

$$\begin{bmatrix} Idc \\ Iqc \end{bmatrix} = \sqrt{2} \begin{bmatrix} -\sin(\theta c - 120) & \sin\theta c \\ -\cos(\theta c - 120) & \cos\theta c \end{bmatrix} \begin{bmatrix} Iuc \\ Ivc \end{bmatrix} \quad (1)$$

The transformation of coordinates is carried out because the currents flowing through the d and q axes are essential for the torque control in the permanent magnet-type synchronous motor.

Alternatively, the torque control may be executed directly with the currents flowing through the three phases. After the transformation to the currents of two axes, the control CPU 90 computes deviations of currents Idc and Iqc actually flowing through the d and q axes from current command values Idc* and Iqc* of the respective axes, which are calculated from the torque command value Tc* of the clutch motor 30, and determines voltage command values Vdc and vqc for the d and q axes at step S144. In accordance with a concrete procedure, the control CPU 90 executes operations following Equations (2) and Equations (3) given below:

$$\Delta Idc = Idc^* - Idc$$

$$\Delta Iqc = Iqc^* - Iqc \quad (2)$$

$$Vdc = Kp1 \cdot \Delta Idc + \Sigma Ki1 \cdot \Delta Idc$$

$$Vqc = Kp2 \cdot \Delta Iqc + \Sigma Ki2 \cdot \Delta Iqc \quad (3)$$

wherein Kp1, Kp2, Ki1, and Ki2 represent coefficients, which are adjusted to be suited to the characteristics of the motor applied. The voltage command value Vdc (Vqc) includes a part in proportion to the deviation ΔI from the current command value I* (first term in right side of Equation (3)) and a summation of historical data of the deviations ΔI for 'i' times (second term in right side).

The control CPU 90 then re-transforms the coordinates of the voltage command values thus obtained (two-phase to three-phase transformation) at step S146. This corresponds to an inverse of the transformation executed at step S142. The inverse transformation determines voltages Vuc, Vvc, and Vwc actually applied to the three-phase coils 36 as given below:

$$\begin{bmatrix} Vuc \\ Vvc \end{bmatrix} = \sqrt{\frac{2}{3}} \begin{bmatrix} \cos\theta c & -\sin\theta c \\ \cos(\theta c - 120) & -\sin(\theta c - 120) \end{bmatrix} \begin{bmatrix} Vdc \\ Vqc \end{bmatrix} \quad (4)$$

$$Vwc = -Vuc - Vvc$$

The actual voltage control is accomplished by on-off operation of the transistors Tr1 through Tr6 in the first driving circuit 91. At step S148, the on- and off-time of the transistors Tr1 through Tr6 in the first driving circuit 91 is PWM (pulse width modulation) controlled in order to attain the voltage command values Vuc, Vvc, and Vwc determined by Equation (4) above.

When the clutch motor control is executed at a fixed driving point of the engine 50, on the other hand, the program determines that neither the target engine torque Te* nor the target engine speed Ne* of the engine 50 has been changed from the previous data at step S120 in the flowchart of FIG. 6, and proceeds to step S122 to receive data of revolving speed Ne of the engine 50. The revolving speed Ne of the engine 50 may be computed from the rotational angle θe of the crankshaft 56 read from the resolver 39 or directly measured by the speed sensor 76 mounted on the distributor 60. In the latter case, the control CPU 90 receives data of revolving speed Ne of the engine 50 through communication with the EFIECU 70, which connects with the speed sensor 76.

The control CPU 90 calculates a deviation ΔNe by subtracting the input revolving speed Ne from the target engine speed Ne* at step S124. The absolute value of deviation ΔNe is compared with a first threshold value Nref1 at step S126 and then with a second threshold value Nref2 at step S128. The first threshold value Nref1 is used to define a range in which the engine 50 can be assumed to be in a stationary driving state at the fixed driving point. When the revolving speed Ne is in this range, that is, in the range of (target engine speed Ne*−first threshold value Nref1) to (target engine speed Ne*+first threshold value Nref1), feedback control is carried out to ensure stable driving of the engine 50. The revolving speed Ne of the engine 50 is controlled with the feedback data of transmitted torque Tc of the clutch motor 30 (that is, torque Te of the engine 50) as described later in detail. The range in which the engine 50 can be assumed to be in a stationary driving state at the fixed driving point is determined depending upon the type, the characteristics, and the driving point of the engine 50. The first threshold value Nref1 is thus individually set by taking into account such properties of the engine 50.

Figure 8:
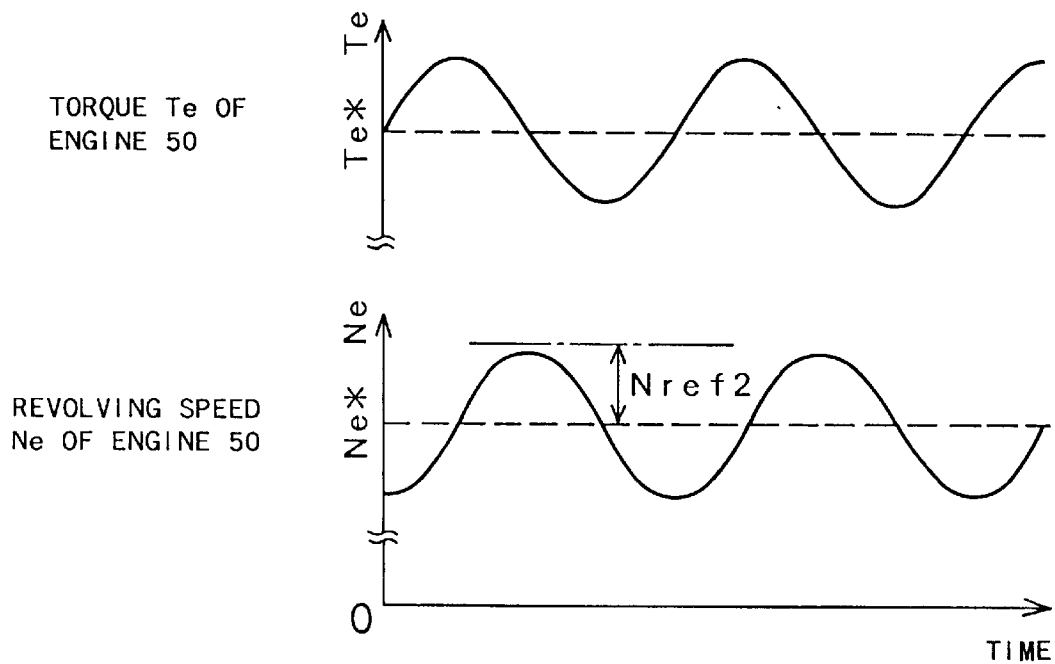
FIG. 8 shows pulsation of the torque Te and the revolving speed Ne of the engine 50.

The second threshold value Nref2 is used to define a dead zone from the target engine speed Ne* in the feedback control. The dead zone is set to include the pulsating components of the revolving speed Ne (unevenness or wide variation in rotation) due to the pulsating outputs of the engine 50 (outputs in the cycle of ingestion, compression, combustion, and exhaust), when the engine 40 is driven at the target engine torque Te* and the target engine speed Ne*. FIG. 8 shows pulsation of the torque Te and the revolving speed Ne of the engine 50. In this embodiment, the second threshold value Nref2 is set to be a little greater than the amplitude of the wave of the pulsating revolving speed Ne as clearly seen in FIG. 8. The pulsating components of the revolving speed Ne are varied depending upon the type, the characteristics, and the driving point of the engine 50. The second threshold value Nref2 is thus individually set by taking into account such properties of the engine 50.

When the absolute value of deviation ΔNe is greater than the first threshold value Nref1 at step S126, the program determines that the engine 50 has not yet reached a stationary driving state, and proceeds to step S134 in the flowchart of FIG. 7. When the absolute value of deviation ΔNe is not greater than the first threshold value Nref1 at step S126 but is greater than the second threshold value Nref2 at step S128, the control CPU 90 sets a new torque command value Tc* of the clutch motor 30 at step S130. The new torque command value Tc* is determined by subtracting the product of a control gain Kn and the deviation ΔNe from the existing data of torque command value Tc* set in the previous cycle of the clutch motor control:

$$Tc^* = \text{Previous } Tc^* - Kn \times \Delta Ne \quad (5)$$

In case output energy Pd of the engine 50 is constant, the torque Te of the engine 50 is equal to the torque Tc of the clutch motor 30. The output energy Pd is equal to the product of the revolving speed Ne and the torque Te of the engine 50. The revolving speed Ne of the engine 50 is thus inversely proportional to the torque Tc of the clutch motor 30. This is the reason why the new torque command value Tc* is calculated according to Equation (5) given above at step S130. The feedback control of the revolving speed Ne of the engine 50 can attain stable driving of the engine 50.

When the absolute value of deviation ΔNe is not greater than the second threshold value Nref2 at step S128, on the other hand, the existing data of torque command value Tc* is set as a new torque command value Tc* at step S132. After the processing of either step S130 or step S132, the program proceeds to step S134 in the flowchart of FIG. 7.

Figure 9:
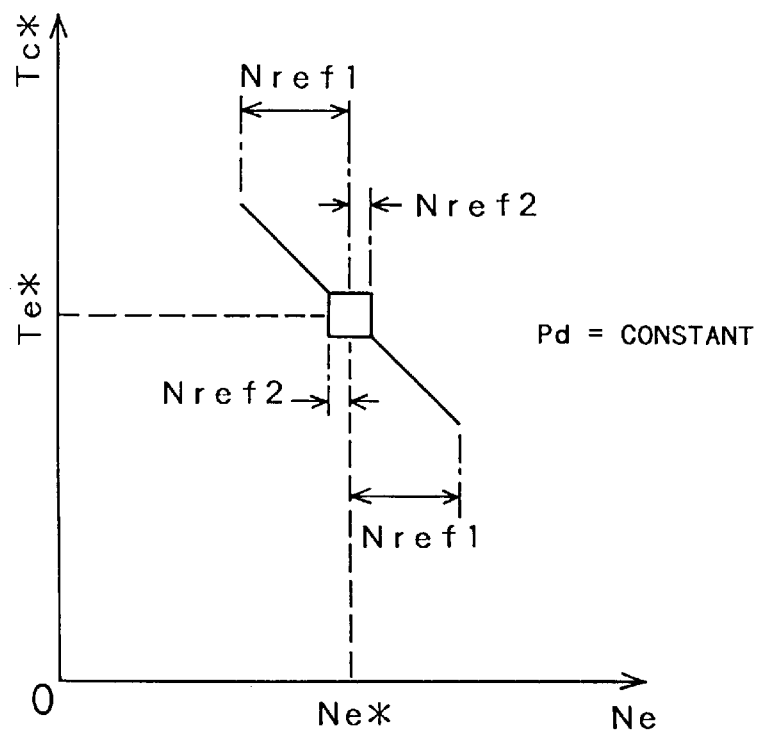
FIG. 9 is a graph illustrating the process of feedback control.

FIG. 9 is a graph showing the concrete process of steps S126 through S132. When the target engine torque Te* and the target engine speed Ne* of the engine 50 are fixed, the torque Tc of the clutch motor 30 is set equal to the target engine torque Te*. The engine 50 is concurrently controlled to attain the target engine torque Te* and the target engine speed Ne* through the engine control process (control of the throttle valve position, fuel injection, and spark ignition by the EFIECU 70 as described later) executed at step S111 in the torque control routine of FIG. 5. When the engine 50 reaches the range of stationary driving state, that is, when the revolving speed Ne reaches the range of (target engine speed Ne*−first threshold value Nref1) to (target engine speed Ne*+first threshold value Nref1), the revolving speed Ne of the engine 50 is controlled on the curve of constant output energy Pd (Pd=Tc×Ne) with the feedback data of transmitted torque Tc of the clutch motor 30 (that is, torque Te of the engine 50). When the revolving speed Ne of the engine 50 enters the dead zone defined by the range of (target engine speed Ne*−second threshold value Nref2) to (target engine speed Ne*+second threshold value Nref2), that is, when the revolving speed Ne enters the box zone in the graph of FIG. 9, no feedback control is carried out but the revolving speed Ne is kept in that state. Since no feedback control is carried out based on the pulsating components of the revolving speed Ne (unevenness or wide variation in rotation), no pulsating outputs are transmitted to the drive shaft 22.

The torque command value Tc* is positive when a positive torque is applied to the drive shaft 22 in the direction of rotation of the crankshaft 56. By way of example, it is assumed that a positive value is set to the torque command value Tc*. When the revolving speed Ne of the engine 50 is greater than the revolving speed Nd of the drive shaft 22 on this assumption, that is, when the revolving speed difference Nc (=Ne−Nd) is positive, the clutch motor 30 is controlled to carry out the regenerative operation and produce a regenerative current corresponding to the revolving speed difference Nc. When the revolving speed Ne of the engine 50 is less than the revolving speed Nd of the drive shaft 22, that is, when the revolving speed difference Nc (=Ne−Nd) is negative, on the contrary, the clutch motor 30 is controlled to carry out the power operation and rotate relative to the crankshaft 56 in the direction of rotation of the drive shaft 22 at a revolving speed defined by the absolute value of the revolving speed difference Nc. For the positive torque command value Tc*, both the regenerative operation and the power operation of the clutch motor 30 implement the identical switching control. In accordance with a concrete procedure, the transistors Tr1 through Tr6 of the first driving circuit 91 are controlled to enable a positive torque to be applied to the drive shaft 22 by the combination of the magnetic field generated by the permanent magnets 35 set on the outer rotor 32 with the rotating magnetic field generated by the currents flowing through the three-phase coils 36 on the inner rotor 34 in the clutch motor 30. The identical switching control is executed for both the regenerative operation and the power operation of the clutch motor 30 as long as the sign of the torque command value Tc* is not changed. The clutch motor control routine of FIGS. 6 and 7 is thus applicable to both the regenerative operation and the power operation. Under the condition of braking the drive shaft 22 or moving the vehicle in reverse, the torque command value Tc* has the negative sign. The clutch motor control routine of FIGS. 6 and 7 is also applicable to the control procedure under such conditions, when the relative angle θc is varied in the reverse direction at step S138.

Figure 10:
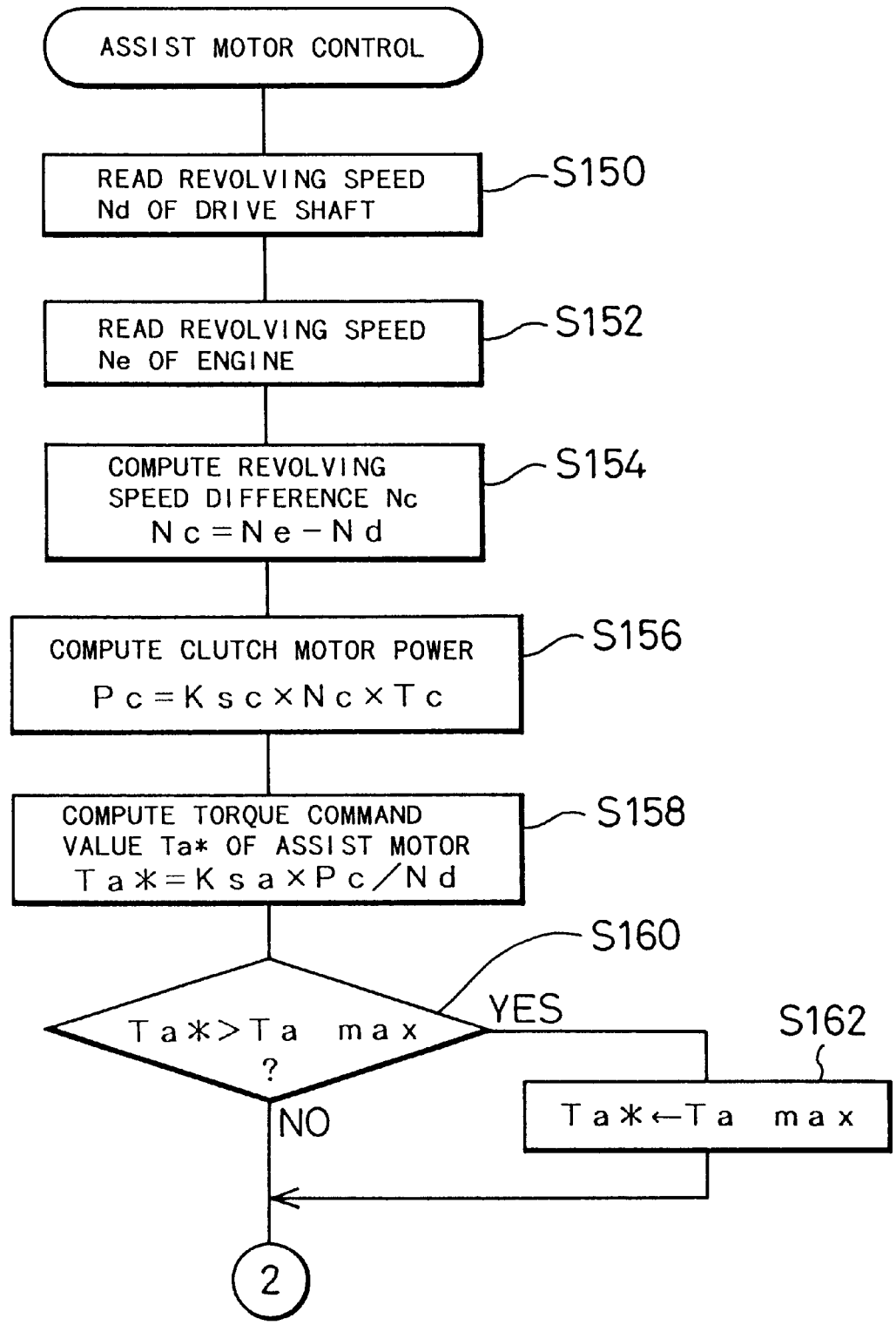
FIGS. 10 and 11 are flowcharts showing details of the control process of the assist motor 40 executed at step S110 in the flowchart of FIG. 5.
Figure 11:
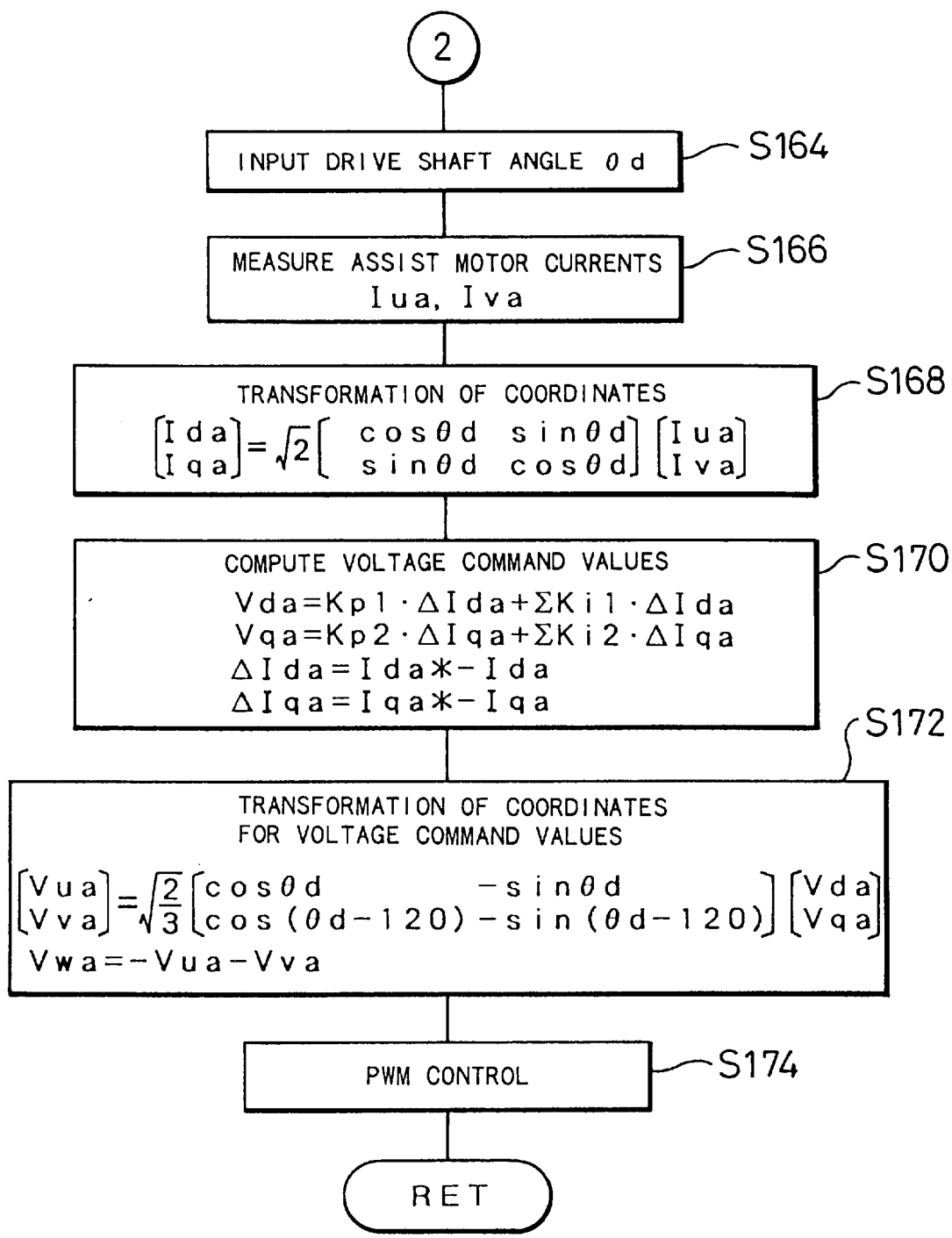

FIGS. 10 and 11 are flowcharts showing details of the control process of the assist motor 40 executed at step S110 in the flowchart of FIG. 5. Referring to the flowchart of FIG. 10, when the program enters the assist motor control routine, the control CPU 90 of the controller 80 first receives data of revolving speed Nd of the drive shaft 22 at step S150. The revolving speed Nd of the drive shaft 22 is computed from the rotational angle θd of the drive shaft 22 read from the resolver 48. The control CPU 90 then receives data of revolving speed Ne of the engine 50 at step S152.

A revolving speed difference Nc between the input revolving speed Nd of the drive shaft 22 and the input revolving speed Ne of the engine 50 is calculated according to the equation Nc=Ne−Nd at step S154. At subsequent step S156, electric power (energy) Pc regenerated or consumed by the clutch motor 30 is calculated according to Equation (6) given as:

$$Pc = Ksc \times Nc \times Tc \quad (6)$$

wherein Ksc represents the efficiency of regenerative operation or power operation in the clutch motor 30. The product Nc×Tc defines the energy corresponding to the region G1 in the graph of FIG. 4, wherein Nc and Tc respectively denote the revolving speed difference and the actual torque produced by the clutch motor 30.

At step S158, a torque command value Ta* of the assist motor 40 is determined by Equation (7) given as:

$$Ta^* = Ksa \times Pc / Nd \quad (7)$$

wherein Ksa represents the efficiency of regenerative operation or power operation in the assist motor 40. The torque command value Ta* of the assist motor 40 thus obtained is compared with a maximum torque Tamax, which the assist motor 40 can potentially apply, at step S160. When the torque command value Ta* exceeds the maximum torque Tamax, the program proceeds to step S162 at which the torque command value Ta* is restricted to the maximum torque Tamax.

After the torque command value Ta* is set equal to the maximum torque Tamax at step S162 or after the torque command value Ta* is determined not to exceed the maximum torque Tamax at step S160, the program proceeds to step S164 in the flowchart of FIG. 11. The control CPU 90 reads the rotational angle θd of the drive shaft 22 from the resolver 48 at step S164, and receives data of assist motor currents Iua and Iva, which respectively flow through the U phase and V phase of the three-phase coils 44 in the assist motor 40, from the ammeters 97 and 98 at step S166. The control CPU 90 then executes transformation of coordinates for the currents of the three phases at step S168, computes voltage command values Vda and Vqa at step S170, and executes inverse transformation of coordinates for the voltage command values at step S172. At subsequent step S174, the control CPU 90 determines the on-and off-time of the transistors Tr11 through Tr16 in the second driving circuit 92 for PWM (pulse width modulation) control. The processing executed at steps S168 through S174 is similar to that executed at steps S142 through S148 of the clutch motor control routine shown in the flowcharts of FIGS. 6 and 7.

The assist motor 40 is subject to the power operation for the positive torque command value Ta* and the regenerative operation for the negative torque command value Ta*. Like the power operation and the regenerative operation of the clutch motor 30, the assist motor control routine of FIGS. 10 and 11 is applicable to both the power operation and the regenerative operation of the assist motor 40. This is also true when the drive shaft 22 rotates in reverse of the rotation of the crankshaft 56, that is, when the vehicle moves back. The torque command value Ta* of the assist motor 40 is positive when a positive torque is applied to the drive shaft 22 in the direction of rotation of the crankshaft 56.

The control of the engine 50 (step S111 in FIG. 5) is executed in the following manner. In order to attain stationary driving at the target engine torque Te* and the target engine speed Ne* (set at step S104 in FIG. 5), the control CPU 90 regulates the torque Te and the revolving speed Ne of the engine 50 to make them approach the target engine torque Te* and the target engine speed Ne*, respectively. In accordance with a concrete procedure, the control CPU 90 sends an instruction to the EFIECU 70 through communication to regulate the amount of fuel injection or the throttle valve position. Such regulation makes the torque Te and the revolving speed Ne of the engine 50 eventually approach the target engine torque Te* and the target engine speed Ne*.

This procedure enables the output (Te×Ne) of the engine 50 to undergo the free torque conversion and be eventually transmitted to the drive shaft 22.

In the structure of the first embodiment, when the revolving speed Ne of the engine 50 is within the range of (target engine speed Ne*−first threshold value Nref1) to (target engine speed Ne*+first threshold value Nref1), the revolving speed Ne is controlled with the feedback data of the torque Tc of the clutch motor 30. The engine 50 is thus driven steadily at the driving point of the target engine torque Te* and the target engine speed Ne*. When the revolving speed Ne of the engine 50 is within the range of (target engine speed Ne*−second threshold value Nref2) to (target engine speed Ne*+second threshold value Nref2), no feedback control of the revolving speed Ne is carried out based on the torque Tc of the clutch motor 30. The unevenness in rotation of the crankshaft 56 (pulsating torque) due to the pulsating outputs of the engine 50 is accordingly not transmitted to the drive shaft 22. This effectively prevents the vehicle from being vibrated by the pulsating outputs of the engine 50, thereby ensuring the better ride.

In the first embodiment, the revolving speed Ne of the engine 50 is feedback controlled by the torque Tc of the clutch motor 30 when the revolving speed Ne is within the range of (Ne*−Nref1) to (Ne*+Nref1). An alternative structure, however, may determine only the non-feedback control zone (the range of (Ne*−Nref2) to (Ne*+Nref2)) without setting the first threshold value Nref1.

A second embodiment of the present invention is realized by a power output apparatus 20B, which has the hardware identical with that of the power output apparatus 20 of the first embodiment. Description is accordingly omitted for the concrete hardware structure and the essential operating principles of the power output apparatus 20B of the second embodiment. The symbols used in the description of the first embodiment denote the like meanings in the second embodiment unless otherwise specified.

The power output apparatus 20B of the second embodiment also executes the torque control routine of FIG. 5, which is executed by the controller 80 of the power output apparatus 20 of the first embodiment. In the second embodiment, however, the processing of step S108 in the flowchart of FIG. 5 follows the clutch motor control routine of FIGS. 12 and 7, in place of the clutch motor control routine of FIGS. 6 and 7 in the first embodiment. The processing of step S110 in the flowchart of FIG. 5 follows the assist motor control routine of FIGS. 13 and 11, in place of the assist motor control routine of FIGS. 10 and 11 in the first embodiment. The following mainly describes the different points of the clutch motor control and the assist motor control executed by the power output apparatus 20B of the second embodiment from the control of the first embodiment.

Figure 12:
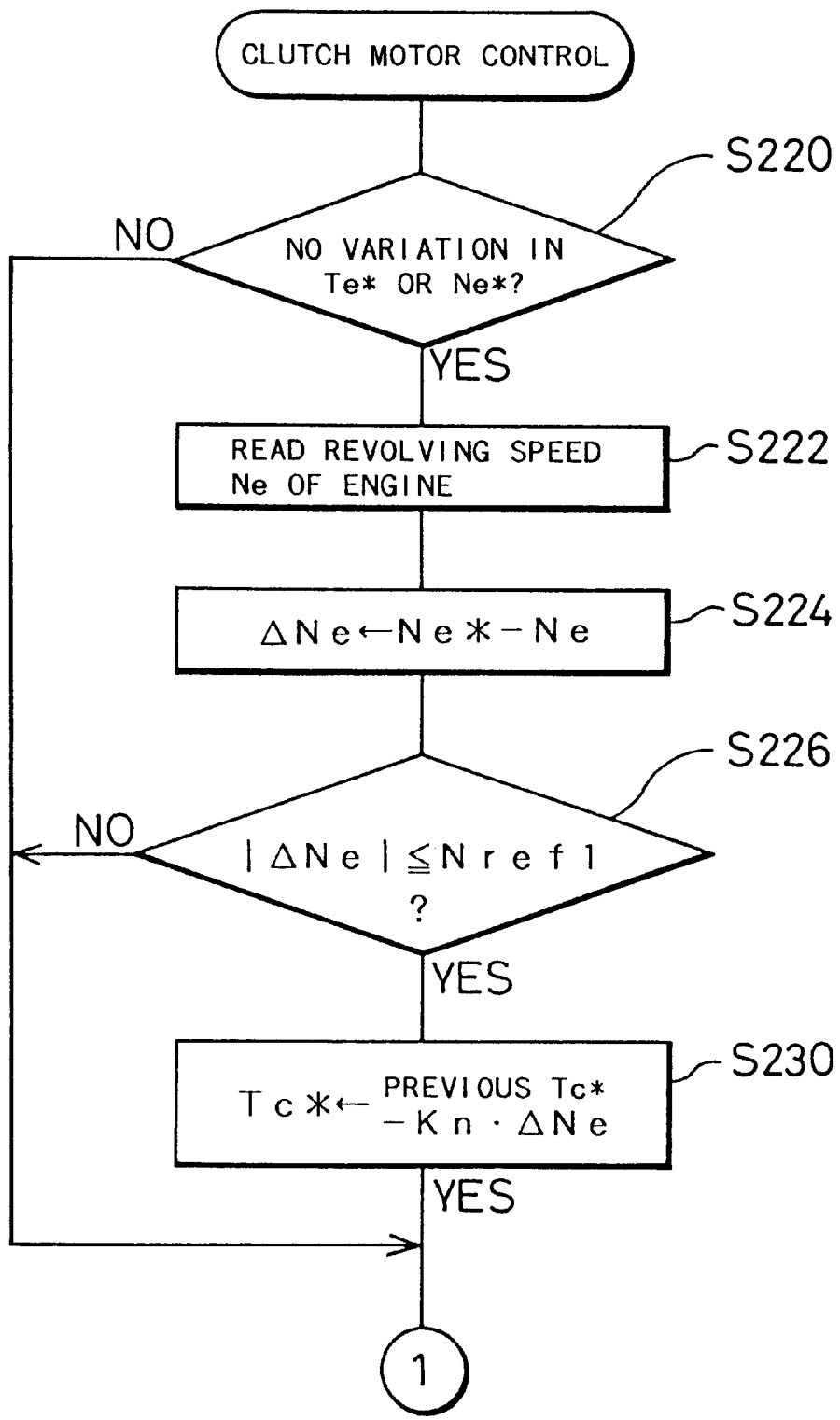
FIG. 12 is a flowchart showing part of the control process of the clutch motor 30 executed by the controller 80 in a power output apparatus 20B of a second embodiment according to the present invention.

When the program enters the clutch motor control routine of FIG. 12, the control CPU 90 of the controller 80 executes the processing of steps S220 through S226, which are identical with steps S120 through S126 in the clutch motor control routine of the first embodiment shown in FIG. 6. The control CPU 90 first determines whether the target engine torque Te* or the target engine speed Ne* of the engine 50 has been changed from the corresponding data of the previous cycle at step S220. When neither the target engine torque Te* nor the target engine speed Ne* has not been changed, the program proceeds to step S222 to receive data of revolving speed Ne of the engine 50. The control CPU 90 then calculates a deviation ΔNe by subtracting the input revolving speed Ne from the target engine speed Ne* at step S224. The absolute value of deviation ΔNe is compared with a threshold value Nref1 at step S226.

When the absolute value of deviation ΔNe is not greater than the threshold value Nref1 at step S226, that is, when the revolving speed Ne of the engine 50 is within the range of (target engine speed Ne*−threshold value Nref1) to (target engine speed Ne*+threshold value Nref1), the program determines that the engine 50 is in the range of stationary driving state. The control CPU 90 then sets a new torque command value Tc* of the clutch motor 30 at step S230 by subtracting the product of the control gain Kn and the deviation ΔNe from the existing data of torque command value Tc* set in the previous cycle of the clutch motor control. The program subsequently executes steps S134 through S148 in the flowchart of FIG. 7 as described previously.

While the dead zone, wherein the revolving speed Ne is within the range of (target engine speed Ne*−second threshold value Nref2) to (target engine speed Ne*+second threshold value Nref2), is set in the clutch motor control of the first embodiment, no such dead zone is set in the clutch motor control of the second embodiment. The feedback control is accordingly implemented with the pulsating components of the revolving speed Ne due to the pulsating outputs of the engine 50. This causes the pulsating torque to be transmitted to the drive shaft 22. In the second embodiment, the pulsating torque transmitted to the drive shaft 22 is reduced by the assist motor control discussed below.

Figure 13:
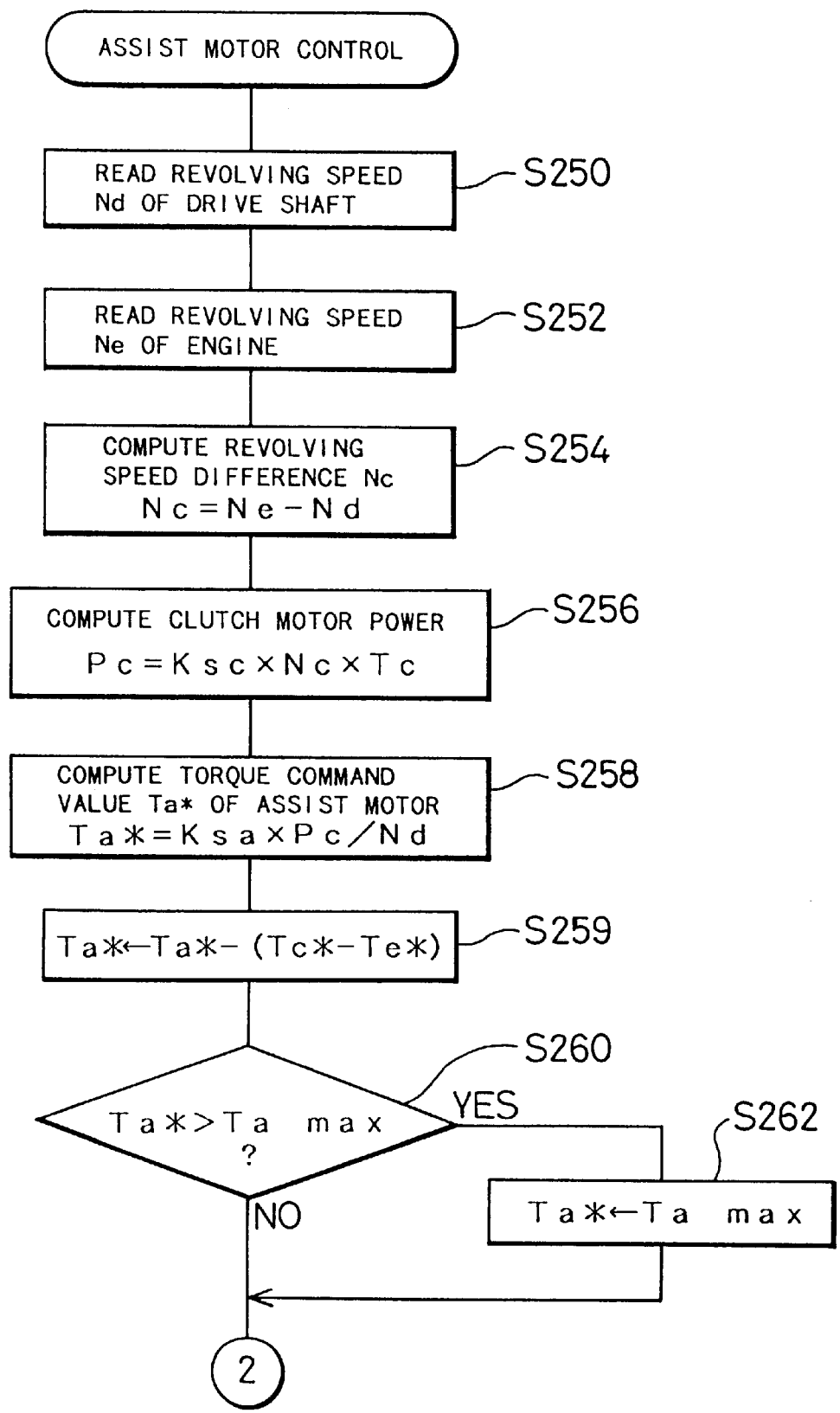
FIG. 13 is a flowchart showing part of the control process of the assist motor 40 executed by the controller 80 in the power output apparatus 20B of the second embodiment.

When the program enters the assist motor control routine of FIG. 13, the control CPU 90 of the controller 80 executes the processing of steps S250 through S258, which are identical with steps S150 through S158 in the assist motor control routine of the first embodiment shown in FIG. 10. The control CPU 90 receives data of revolving speed Nd of the drive shaft 22 at step S250 and data of revolving speed Ne of the engine 50 at step S252, and calculates the revolving speed difference Nc at step S254. The control CPU 90 successively calculates the electric power Pc regenerated by the clutch motor 30 at step S256 and the torque command value Ta* of the assist motor 40 at step S258.

At subsequent step S259, a new torque command value Ta* of the assist motor 40 is determined according to Equation (8) given below; that is, by subtracting the difference between the torque command value Tc* of the clutch motor 30 and the target engine torque Te* from the torque command value Ta* computed at step S258:

$$\text{new } Ta^* = Ta^* - (Tc^* - Te^*) \qquad (8)$$

wherein the torque command value Tc* is determined by the processing of steps S220 through S230 in the flowchart of FIG. 12 and used for the processing of steps S134 through S148 in the flowchart of FIG. 7. The torque command value Tc* in Equation (8) may be the new torque command value Tc* set at step S230 in the flowchart of FIG. 12 or otherwise the torque command value Tc* set at step S106 in the flowchart of FIG. 5.

After setting the new torque command value Ta* at step S259, the control CPU 90 compares the new torque command value Ta* thus obtained with the maximum torque Tamax, which the assist motor 40 can potentially apply, at step S260. When the torque command value Ta* exceeds the maximum torque Tamax, the program proceeds to step S262 at which the torque command value Ta* is restricted to the maximum torque Tamax. The program then proceeds to steps S164 through S174 in the flowchart of FIG. 11 described previously.

In the power output apparatus 20B of the second embodiment, the clutch motor control is carried out synchronously with the assist motor control. In accordance with a concrete procedure, operation of the voltages Vuc, Vvc, and Vwc applied to the three-phase coils 36 in the clutch motor control is carried out simultaneously with that of the voltages Vua, Vva, and Vwa applied to the three-phase coils 44 in the assist motor control. The PWM control of on- and off-time of the transistors Tr1 through Tr6 in the clutch motor control (step S148 in the flowchart of FIG. 7) is synchronous with the same of the transistors Tr11 through Tr16 in the assist motor control (step S174 in the flowchart of FIG. 11).

The second embodiment is characterized by the synchronous clutch motor control with the assist motor control and the operation of the voltages applied to the three-phase coils 44 based on the torque command value Ta* calculated according to Equation (8) at step S259 in the assist motor control. These characteristics allow the assist motor 40 to cancel the pulsating torque transmitted via the clutch motor 30 to the drive shaft 22.

Figure 14:
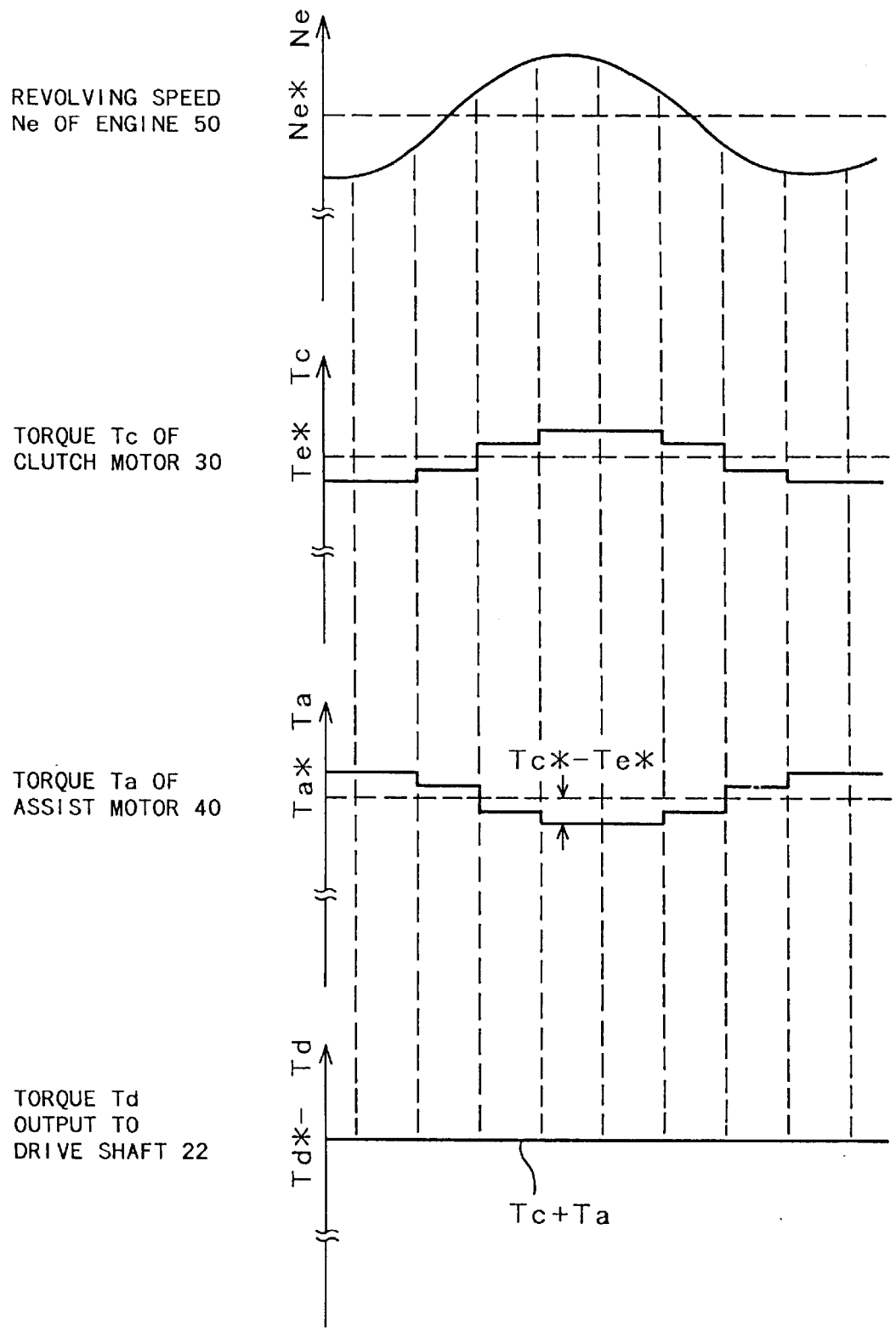
FIG. 14 shows the revolving speed Ne of the engine 50, the torque Tc of the clutch motor 30, the torque Ta of the assist motor 40, and the torque Td output to the drive shaft 22 when the engine 50 is in a stationary driving state at the fixed driving point of the target engine torque Te* and the target engine speed Ne* in the second embodiment.

FIG. 14 shows the revolving speed Ne of the engine 50, the torque Tc of the clutch motor 30, the torque Ta of the assist motor 40, and the torque Td output to the drive shaft 22 when the engine 50 is in a stationary driving state at the fixed driving point of the target engine torque Te* and the target engine speed Ne*. The revolving speed Ne of the engine 50 is varied in a periodic way about the target engine speed Ne*. In order to make the revolving speed Ne of the engine 50 approach the target engine speed Ne*, the transmitted torque Tc of the clutch motor 30 is pulsated about the target engine torque Te*. In the stationary driving state, calculation of step S258 gives a constant torque command value Ta* of the assist motor 40. The final torque command value Ta* of the assist motor 40 determined at step S259 by subtracting the difference between the torque command value Tc* and the target engine torque Te* from the constant torque command value Ta* is, however, pulsated with the same amplitude as the transmitted torque Tc of the clutch motor 30. Since the clutch motor control is synchronous with the assist motor control, the pulsating torque command value Ta* of the assist motor 40 has a phase difference of π from the pulsating torque Tc of the clutch motor 30. The drive shaft 22 receives both the torque Tc of the clutch motor 30 and the torque Ta of the assist motor 40. The pulsating torque Tc of the clutch motor 30 and the pulsating torque Ta of the assist motor 40 having the phase difference of π cancel each other, so that a non-pulsating torque is applied to the drive shaft 22.

In the power output apparatus 20B of the second embodiment, even when the feedback control of the revolving speed Ne of the engine 50 based on the torque Tc of the clutch motor 30 causes the pulsating power of the engine 50 to be transmitted to the drive shaft 22, the torque Ta of the assist motor 40 is controlled to cancel the pulsating transmitted torque Tc of the clutch motor 30. A non-pulsating torque is eventually applied to the drive shaft 22. This structure effectively prevents the vehicle from being vibrated by the pulsating outputs of the engine 50, thereby ensuring the better ride.

The structure of the second embodiment subtracts the pulsating torque TC of the clutch motor 30 from the torque command value Ta* of the assist motor 40 in order to cancel the pulsating torque transmitted via the clutch motor 30 to the drive shaft 22. In accordance with one modified structure, waveforms of the pulsating torque transmitted to the drive shaft 22 by the clutch motor 30 are measured at various driving points of the engine 50 and stored in advance. The waveform of the pulsating torque corresponding to a certain driving point of the engine 50 is inverted and added to the torque command value Ta* of the assist motor 40, in order to cancel the pulsating torque transmitted via the clutch motor 30 to the drive shaft 22. In this structure, it is not required to carry out the clutch motor control synchronously with the assist motor control. The inverted waveform of the pulsating torque should be added to the torque command value Ta* of the assist motor 40 at a specific timing based on the rotational angle θe of the crankshaft 56 of the engine 50 measured by the resolver 39.

A third embodiment of the present invention is realized by a power output apparatus 20C, which has the hardware identical with that of the power output apparatus 20 of the first embodiment. Description is accordingly omitted for the concrete hardware structure and the essential operating principles of the power output apparatus 20C of the third embodiment. The symbols used in the description of the first embodiment denote the like meanings in the third embodiment unless otherwise specified.

The power output apparatus 20C of the third embodiment also executes the torque control routine of FIG. 5, which is executed by the controller 80 of the power output apparatus 20 of the first embodiment. In the third embodiment, however, like the second embodiment, the processing of step S108 in the flowchart of FIG. 5 follows the clutch motor control routine of FIGS. 12 and 7, in place of the clutch motor control routine of FIGS. 6 and 7 in the first embodiment. The processing of step S110 in the flowchart of FIG. 5 follows the assist motor control routine of FIGS. 10 and 15, in place of the assist motor control routine of FIGS. 10 and 11 in the first embodiment. The clutch motor control has already been described in the second embodiment and is thus not explained here. The following mainly describes the different points of the assist motor control executed by the power output apparatus 20C of the third embodiment from the control of the first embodiment.

When the program enters the assist motor control routine, the control CPU 90 of the controller 80 first executes the processing of steps S150 through S162 in the assist motor control routine of the first embodiment shown in FIG. 10, which has already been described in the first embodiment and is thus not explained here.

Figure 15:
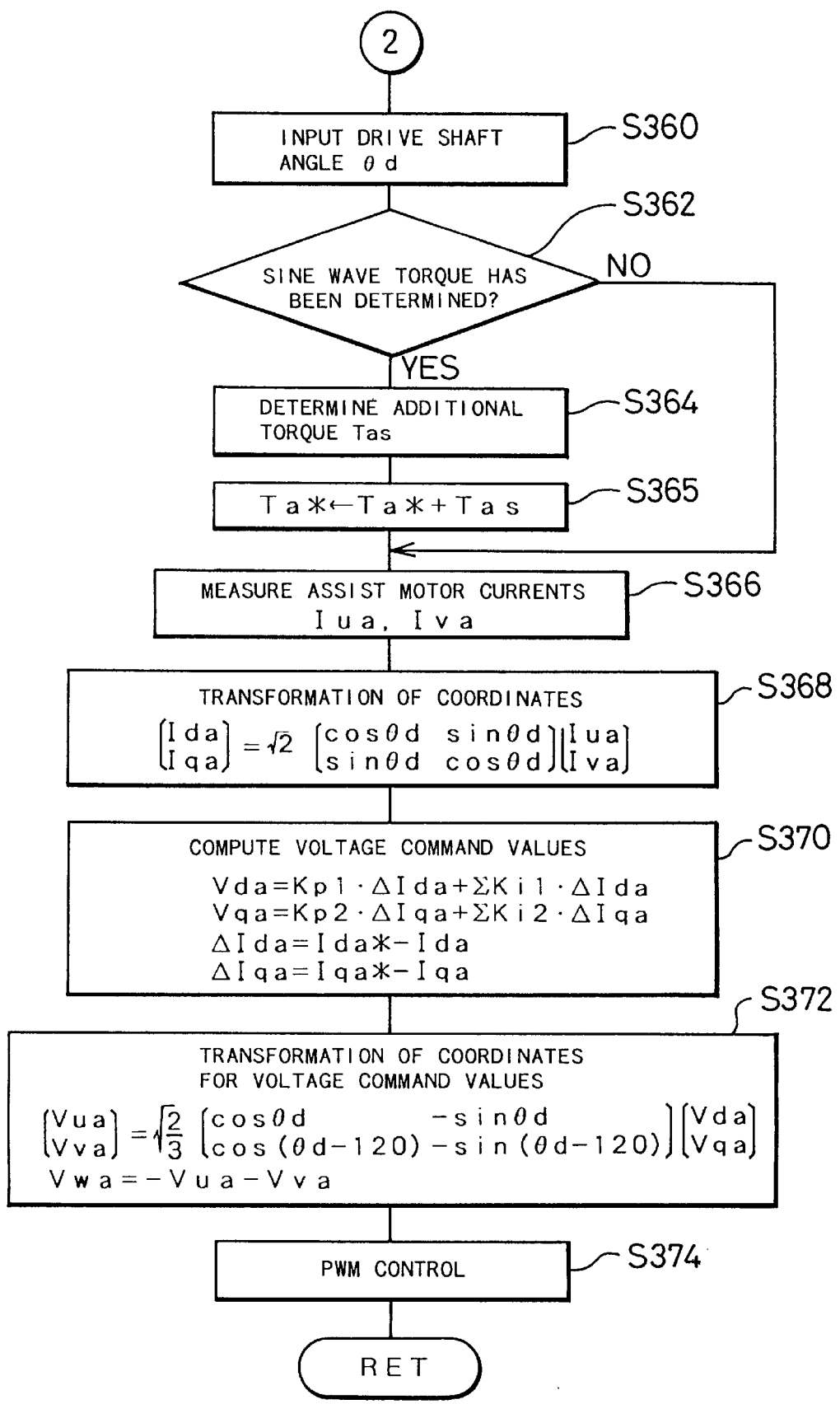
FIG. 15 is a flowchart showing part of the control process of the assist motor 40 executed by the controller 80 in a power output apparatus 20C of a third embodiment according to the invention.

The control CPU 90 then reads the rotational angle θd of the drive shaft 22 from the resolver 48 at step S360 in the flowchart of FIG. 15. At subsequent step S362, it is determined whether a required sine wave torque has already been determined. The required sine wave torque functions to reduce the pulsating torque transmitted to the drive shaft 22 and is determined according to a sine wave torque determination routine of FIG. 16.

The sine wave torque determination routine is executed to determine a required sine wave torque, which can reduce the pulsating torque transmitted to the drive shaft 22, when the feedback control is initiated in the clutch motor control routine of FIG. 12 in order to control the revolving speed Ne of the engine 50 based on the feedback data of torque Tc of the clutch motor 30, that is, when the absolute value of deviation ΔNe becomes equal to or less than the threshold value Nref1 at step S226.

Figure 16:
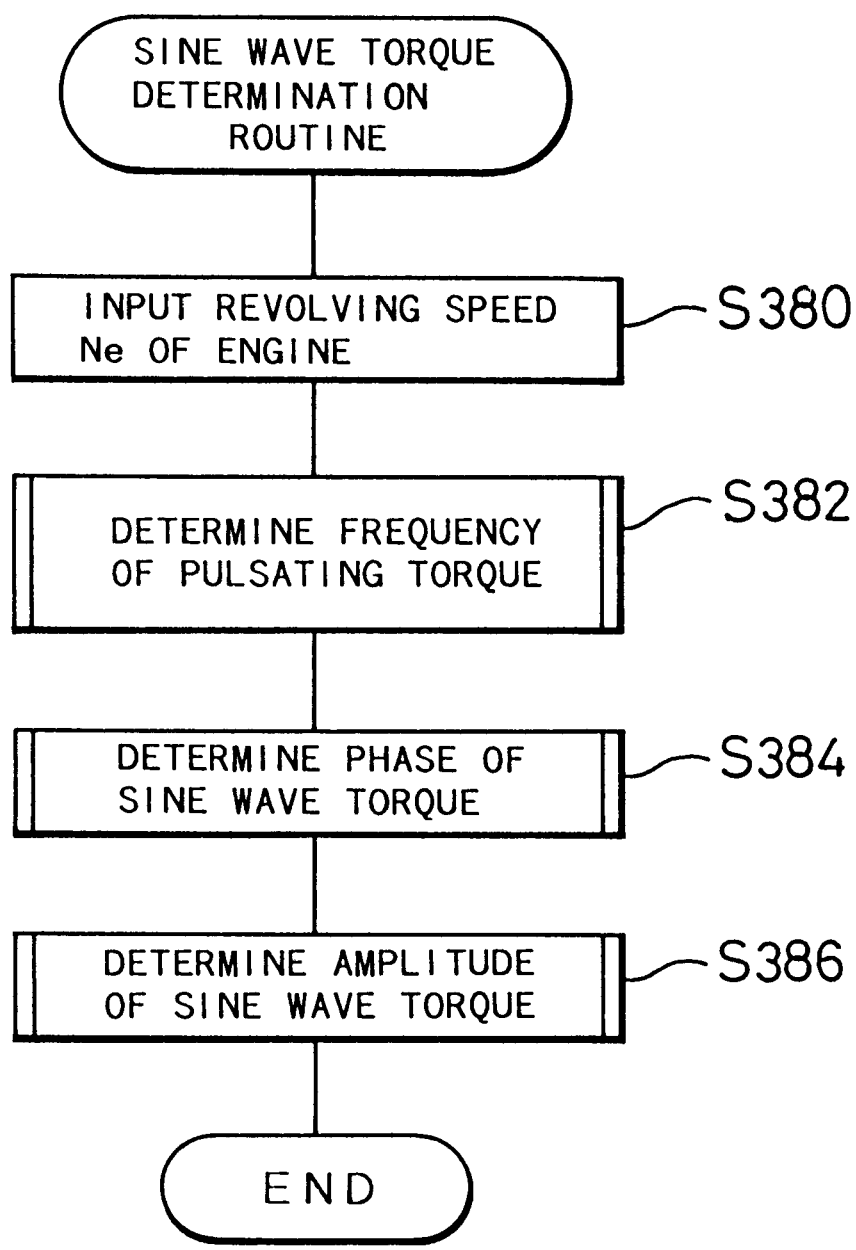
FIG. 16 is a flowchart showing a sine wave torque determination routine executed by the controller 80 of the power output apparatus 20C of the third embodiment.

When the program enters the sine wave torque determination routine of FIG. 16, the control CPU 90 of the controller 80 first reads the data of revolving speed Ne of the engine 50 at step S380. The frequency of the pulsating torque transmitted to the drive shaft 22 is calculated from the input revolving speed Ne of the engine 50 at step S382. The pulsating torque transmitted to the drive shaft 22 is based on the pulsating outputs of the engine 50. When the number of pulsations per revolution of the engine 50 is known, the frequency of the pulsating torque can be determined by measuring the revolving speed Ne of the engine 50. The number of pulsations per revolution of the engine 50 can be determined according to the type and the number of cylinders of the engine 50 and the connection of the piston of each cylinder with the crankshaft 56.

Sine wave torques with a given amplitude but different phases are successively added to the drive shaft 22 at the specific frequency calculated from the revolving speed Ne of the engine 50. The control CPU 90 concurrently measures the revolving speed Nd of the drive shaft 22 to detect a variation in rotation of the drive shaft 22. The control CPU 90 extracts the optimal phase which can minimize the amplitude of the variation in rotation, and determines the optimal phase as a fixed phase of a required sine wave torque at step S384. The given amplitude is, for example, determined as the average of the pulsating torque transmitted to the drive shaft 22 based on the historical experimental data. The given amplitude may, however, be any arbitrary value as long as it can affect the variation in rotation of the drive shaft 22. The variation in rotation of the drive shaft 22 is determined by measuring the revolving speed Ne of the drive shaft 22 a plurality of times at predetermined intervals. The amplitude of the variation in rotation depends upon the amplitude of pulsation. The sine wave torque may be added to the drive shaft 22 by any desired method. By way of example, a new torque command value Ta* of the assist motor 40 is determined by adding a value of sine wave torque corresponding to the rotational angle θd of the drive shaft 22 to the torque command value Ta*, and the processing of steps S166 through S174 in the flowchart of FIG. 11 in the first embodiment is executed with the new torque command value Ta*. Although the difference in phase between each pair of sine wave torques added to the drive shaft 22 at step S384 is π/64 in the third embodiment, the sine wave torques may have any phase difference.

While sine wave torques with the fixed phase but various amplitudes are successively added to the drive shaft 22, a variation in rotation of the drive shaft 22 is detected. The control CPU 90 extracts the optimal amplitude which can minimize the amplitude of the variation in rotation, and determines the optimal amplitude as a fixed amplitude of the required sine wave torque at step S386. The program then exits from the sine wave torque determination routine and returns to the assist motor control routine of FIG. 15. Although the amplitude of sine wave torques added to the drive shaft 22 at step S386 is varied from the given amplitude by the magnitude of 1/50 at a time, the amplitude may be varied by any desired magnitude at a time. In this manner, the control CPU 90 determines the frequency, the phase, and the amplitude of the required sine wave torque which can reduce the pulsating torque transmitted to the drive shaft 22.

The sine wave torque determination routine of FIG. 16 is executed to determine a required sine wave torque when the revolving speed Ne of the engine 50 is determined to reach a stationary state. When the revolving speed Ne of the engine 50 has not yet reached a stationary state or otherwise when the sine wave torque determination routine of FIG. 16 has not yet been completed to determine a required sine wave torque, it is determined that a required sine wave torque has not yet been determined at step S362 in the flowchart of FIG. 15. In this case, the program proceeds to steps S366 through S374, which are identical with steps S166 through S174 of the first embodiment shown in FIG. 11 and thus not described here.

When it is determined that a required sine wave torque has already been determined at step S362, the program proceeds to step S364 to determine an additional torque Tas. The additional torque Tas represents the value of sine wave torque corresponding to the rotational angle θd of the drive shaft 22 input at step S360 (more specifically, the value of equation of sine wave torque at a time point corresponding to the rotational angle θd of the drive shaft 22). A new torque command value Ta* of the assist motor 40 is determined by adding the additional torque Tas to the torque command value Ta* at step S365. The processing of steps S366 through S374 is then executed with the new torque command value Ta*.

In the power output apparatus 20C of the third embodiment, the pulsating torque transmitted to the drive shaft 22 can be reduced by adding a sine wave torque with the specific frequency based on the revolving speed Ne of the engine 50, the optimal phase, and the optimal amplitude to the drive shaft 22. This structure effectively prevents the vehicle from being vibrated by the pulsating outputs of the engine 50, thereby ensuring the better ride. The phase and the amplitude of the additional sine wave torque are determined every time when the revolving speed Ne of the engine reaches a stationary state. The varying pulsation can thus be reduced even when the pulsating torque transmitted to the drive shaft 22 is varied with the elapse of time.

In the power output apparatus 20C of the third embodiment, the pulsating torque transmitted to the drive shaft 22 is reduced by the sine wave torque having the optimally adjusted frequency, phase, and amplitude. One modified structure may detect a further variation in rotation of the drive shaft 22 based on the data of revolving speed Nd of the drive shaft 22 after the addition of the sine wave torque, determine a second sine wave torque which can reduce the further variation in rotation, and add the second sine wave torque to the drive shaft 22. In this structure, the second sine wave torque is determined in response to the pulsating torque generated after the addition of the sine wave torque to the drive shaft 22. The frequency of the second sine wave torque can be set based on the variation in rotation of the drive shaft 22, whereas the phase and the amplitude of the second sine wave torque are determined in the same manner as above. Third, fourth, and further sine wave torques may be added to the drive shaft 22 according to the requirements.

The first through the third embodiments described above controls the engine 50 to make the revolving speed Ne of the engine 50 approach the target engine speed Ne*. In another preferred structure, the engine 50 may be controlled to make the torque Te*. In the latter case, the torque Te of the engine 50 may be read from data of stress-distortion curves measured with a distortion gauge attached to the crankshaft 56, or estimated from the torque Tc of the clutch motor 30 and revolving speed Ne of the ending 50.

In the first through the third embodiments described above, the revolving speed Ne of the engine 50 is controlled with the feedback data of torque Tc of the clutch motor 30. Another modified structure may feedback control the difference between the revolving speed Ne of the engine 50 and the revolving speed Nd of the drive shaft 22 with the data of torque Tc of the clutch motor 30, in order to make the difference between Ne and Nd coincide with the difference between the target engine speed Ne* and the revolving speed Nd.

In the first through the third embodiments, the clutch motor 30 and the assist motor 40 are separately attached to the different positions of the drive shaft 22. Like a modified power output apparatus 20D illustrated in FIG. 17, however, the clutch motor and the assist motor may integrally be joined with each other. A clutch motor 30D of the power output apparatus 20D includes an inner rotor 34D connecting with the crankshaft 56 and an outer rotor 32D linked with the drive shaft 22. Three-phase coils 36D are attached to the inner rotor 34D, and permanent magnets 35D are set on the outer rotor 32D in such a manner that the outer surface and the inner surface thereof have different magnetic poles. An assist motor 40D includes the outer rotor 32D of the clutch motor 30D and a stator 43 with three-phase coils 44 mounted thereon. In this structure, the outer rotor 32D of the clutch motor 30D also works as a rotor of the assist motor 40D. Since the three-phase coils 36D are mounted on the inner rotor 34D connecting with the crankshaft 56, a rotary transformer 38D for supplying electric power to the three-phase coils 36D of the clutch motor 30D is attached to the crankshaft 56.

In the power output apparatus 20D, the voltage applied to the three-phase coils 36D on the inner rotor 34D is controlled against the inner-surface magnetic pole of the permanent magnets 35D set on the outer rotor 32D. This allows the clutch motor 30D to work in the same manner as the clutch motor 30 of the power output apparatus 20 shown in FIG. 1. The voltage applied to the three-phase coils 44 on the stator 43 is controlled against the outer-surface magnetic pole of the permanent magnets 35D set on the outer rotor 32D. This allows the assist motor 40D to work in the same manner as the assist motor 40 of the power output apparatus 20. The torque control routine of FIG. 5, the clutch motor control routines of FIGS. 6, 7, and 12, and the assist motor control routines of FIGS. 10, 11, 13, and 15 are also applicable to the power output apparatus 20D shown in FIG. 17, which accordingly implements the same operations and exerts the same effects as those of the power output apparatus 20 shown in FIG. 1.

As discussed above, the outer rotor 32D functions concurrently as one of the rotors in the clutch motor 30D and as the rotor of the assist motor 40D, thereby effectively reducing the size and weight of the whole power output apparatus 20D.

Figure 18:
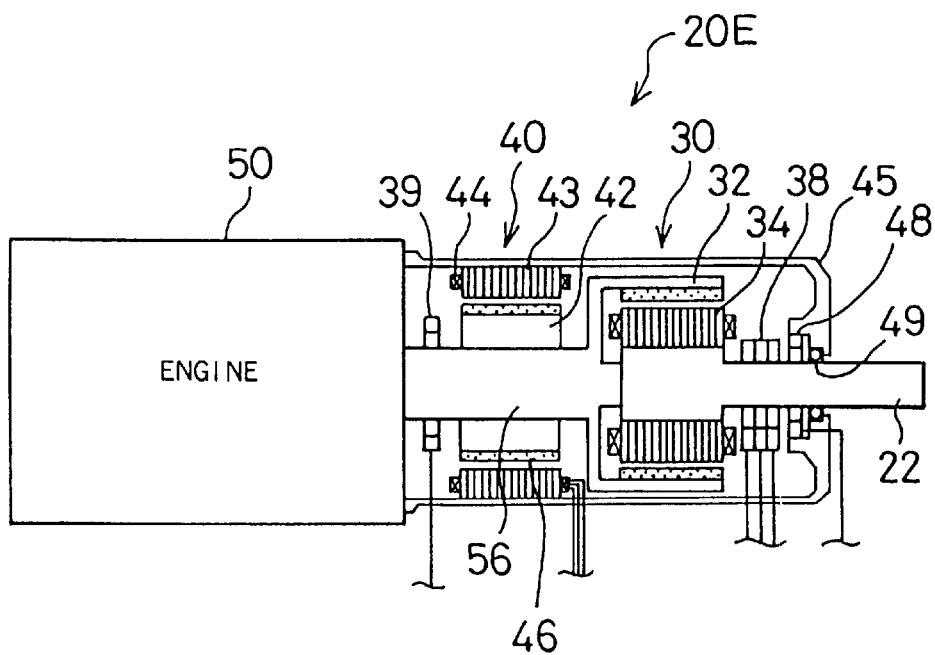
FIG. 18 schematically illustrates another power output apparatus 20E as a modification of the first embodiment.
Figure 19:
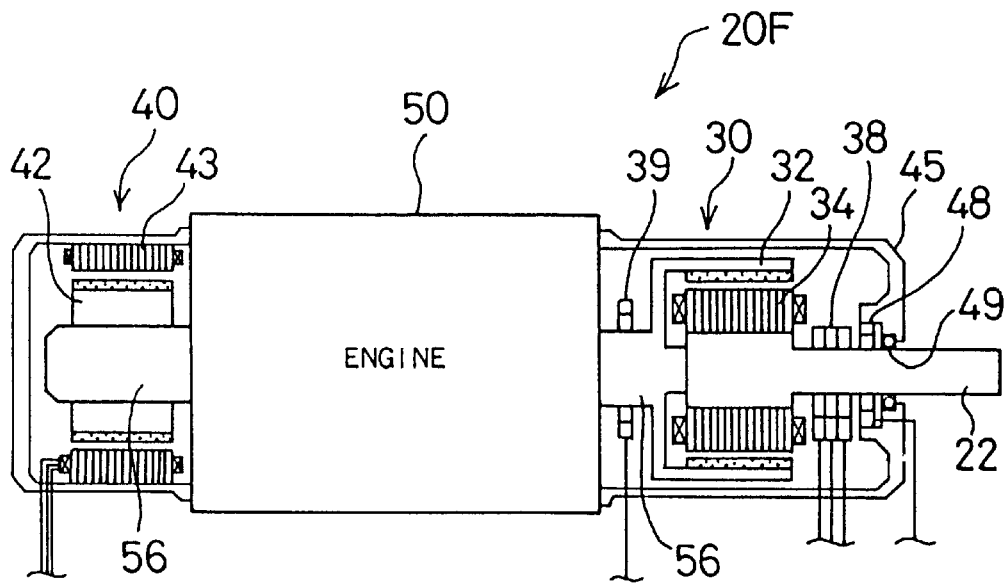
FIG. 19 schematically illustrates a power output apparatus 20F as another modification of the first embodiment.

The control procedures of the first embodiment are also applicable to another modified power output apparatus 20E shown in FIG. 18, wherein the assist motor 40 is interposed between the engine 50 and the clutch motor 30 or to still another modified power output apparatus 20F shown in FIG. 19, wherein the engine 50 is interposed between the clutch motor 30 and the assist motor 40. The following describes the essential operations of the power output apparatus 20E shown in FIG. 18 and the power output apparatus 2OF shown in FIG. 19.

By way of example, it is assumed that the engine 50 is driven at a driving point of a torque Te and a revolving speed Ne. When a torque Ta is added to the crankshaft 56 by the assist motor 40 linked with the crankshaft 56, the sum of the torques (Te+Ta) consequently acts on the crankshaft 56. When the clutch motor 30 is controlled to produce the torque Tc equal to the sum of the torques (Te+Ta), the torque Tc (=Te+Ta) is transmitted to the drive shaft 22.

When the revolving speed Ne of the engine 50 is greater than the revolving speed Nd of the drive shaft 22, the clutch motor 30 regenerates electric power based on the revolving speed difference Nc between the revolving speed Ne of the engine 50 and the revolving speed Nd of the drive shaft 22. The regenerated power is supplied to the assist motor 40 via the power lines P1 and P2 and the second driving circuit 92 to activate the assist motor 40. Provided that the torque Ta of the assist motor 40 is substantially equivalent to the electric power regenerated by the clutch motor 30, free torque conversion is allowed for the energy output from the engine 50 within a range holding the relationship of Equation (9) given below. Since the relationship of Equation (9) represents the ideal state with an efficiency of 100%, (Tc× Nd) is a little smaller than (Te×Ne) in the actual state.

$$Te \times Ne = Tc \times Nd \qquad (9)$$

Referring to FIG. 4, under the condition that the crankshaft 56 rotates with the torque T1 and at the revolving speed N1, the energy corresponding to the sum of the regions (G1+G3) is regenerated by the clutch motor 30 and supplied to the assist motor 40. The assist motor 40 converts the received energy in the sum of the regions (G1+G3) to the energy corresponding to the sum of the regions (G2+G3) and transmits the converted energy to the crankshaft 56.

When the revolving speed Ne of the engine 50 is smaller than the revolving speed Nd of the drive shaft 22, the clutch motor 30 works as a normal motor. In the clutch motor 30, the inner rotor 34 rotates relative to the outer rotor 32 in the direction of rotation of the drive shaft 22 at a revolving speed defined by the absolute value of the revolving speed difference Nc (=Ne−Nd). Provided that the torque Ta of the assist motor 40 is set to a negative value, which enables the assist motor 40 to regenerate electric power substantially equivalent to the electrical energy consumed by the clutch motor 30, free torque conversion is also allowed for the energy output from the engine 50 within the range holding the relationship of Equation (9) given above.

Referring to FIG. 4, under the condition that the crankshaft 56 rotates with the torque T2 and at the revolving speed N2, the energy corresponding to the region G2 is regenerated by the assist motor 40 and consumed by the clutch motor 30 as the energy corresponding to the region G1.

The clutch motors 30 of the power output apparatus 20E and the power output apparatus 20F function in the same manner as the clutch motor 30 of the power output apparatus 20 of the first embodiment. The control procedures of the first embodiment are thus applicable to these power output apparatuses 20E and 20F.

Figure 20:
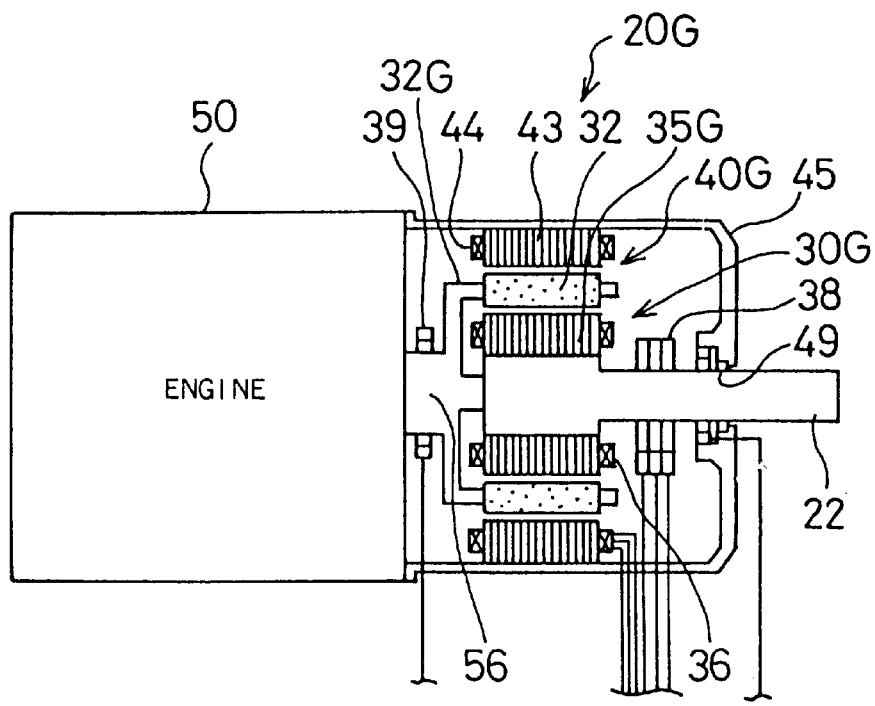
FIG. 20 schematically illustrates a power output apparatus 20G as still another modification of the first embodiment.

In the power output apparatus 20E of FIG. 18, the clutch motor 30 and the assist motor 40 are separately attached to the different positions of the crankshaft 56. Like still another power output apparatus 20G shown in FIG. 20, however, the clutch motor and the assist motor may integrally be joined with each other. A clutch motor 30G of the power output apparatus 20G includes an outer rotor 32G connecting with the crankshaft 56 and an inner rotor 34 linked with the drive shaft 22. Three-phase coils 36 are attached to the inner rotor 34, and permanent magnets 35G are set on the outer rotor 32G in such a manner that the outer surface and the inner surface thereof have different magnetic poles. An assist motor 40G includes the outer rotor 32G of the clutch motor 30G and a stator 43 with three-phase coils 44 mounted thereon. In this structure, the outer rotor 32G of the clutch motor 30G also works as a rotor of the assist motor 40G.

In the power output apparatus 20G, the voltage applied to the three-phase coils 36 on the inner rotor 34 is controlled against the inner-surface magnetic pole of the permanent magnets 35G set on the outer rotor 32G. This allows the clutch motor 30G to work in the same manner as the clutch motor 30 of the power output apparatus 20E shown in FIG. 18. The voltage applied to the three-phase coils 44 on the stator 43 is controlled against the outer-surface magnetic pole of the permanent magnets 35G set on the outer rotor 32G. This allows the assist motor 40G to work in the same manner as the assist motor 40 of the power output apparatus 20E. The control procedures of the first embodiment are thus applicable to the power output apparatus 20G shown in FIG. 20, which accordingly implements the same operations and exerts the same effects as those of the power output apparatus 20E shown in FIG. 18.

Figure 17:
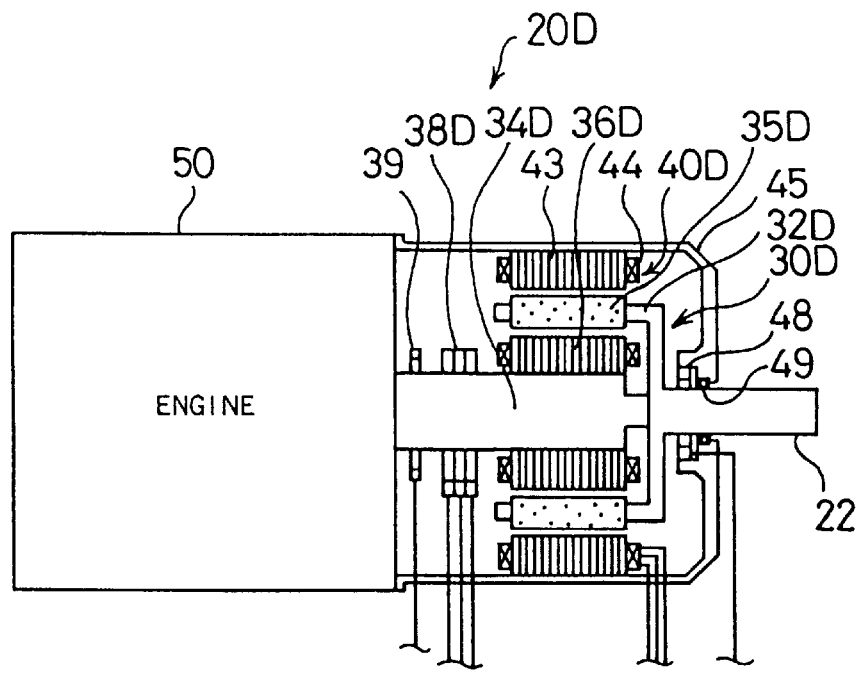
FIG. 17 schematically illustrates a power output apparatus 20D as a modification of the power output apparatuses of the first through the third embodiments.

Like the power output apparatus 20D shown in FIG. 17, the clutch motor and the assist motor are integrally joined with each other, thereby effectively reducing the size and weight of the whole power output apparatus 20G.

There may be many other modifications, alternations, and changes without departing from the scope or spirit of essential characteristics of the invention. It is thus clearly understood that the above embodiments are only illustrative and not restrictive in any sense.

Figure 21:
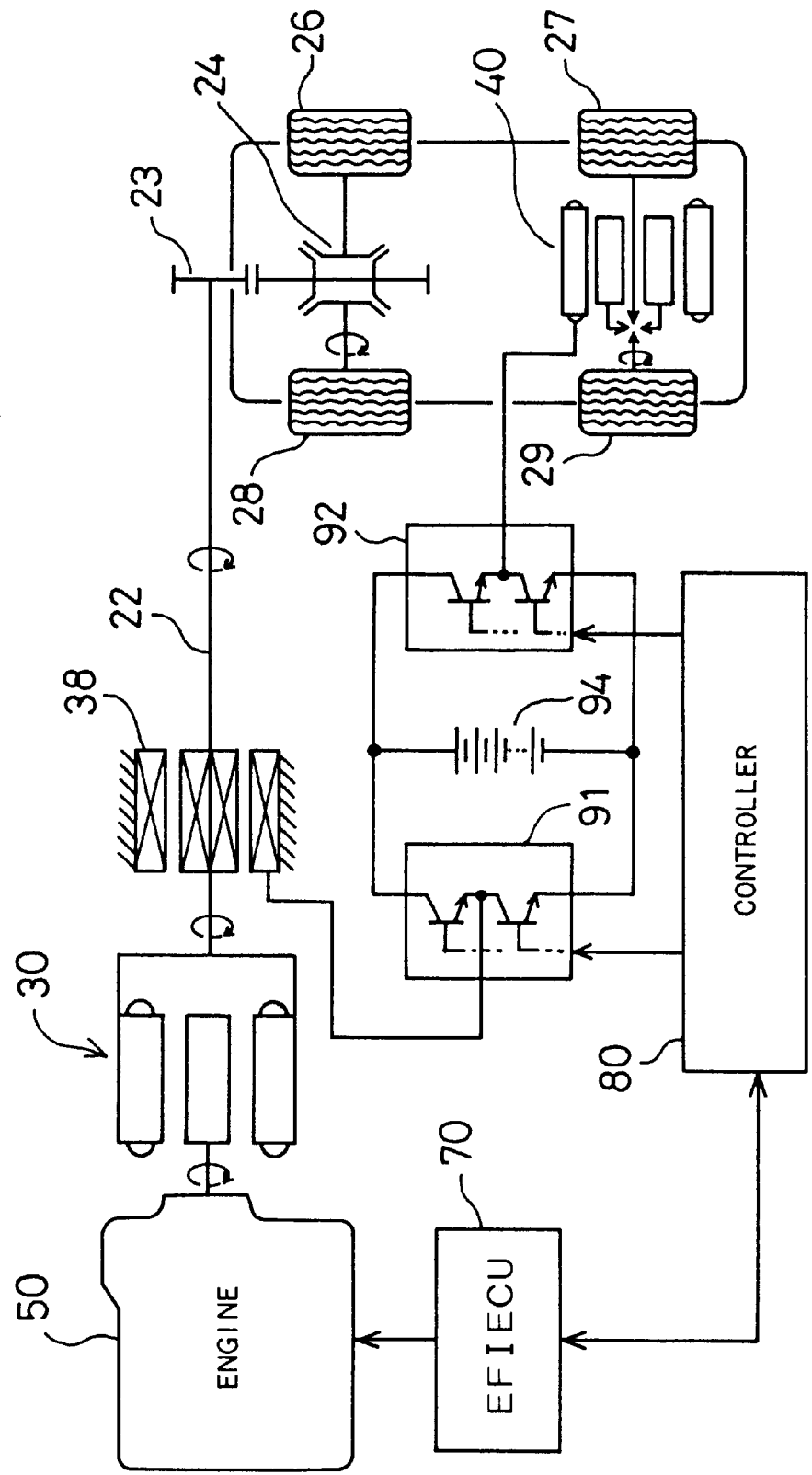
FIG. 21 shows application of the power plant 20 of FIG. 1 to a vehicle with a four-wheel drive.

For example, the power output apparatus 20 of FIG. 1 is applicable to the vehicle with a four-wheel drive (4WD) as shown in FIG. 21. In the structure of FIG. 21, the assist motor 40, which is mechanically linked with the drive shaft 22 in the structure of FIG. 1, is separated from the drive shaft 22 and independently disposed in a rear-wheel portion of the vehicle in order to drive rear driving wheels 27 and 29. One end of the drive shaft 22 is linked with a differential gear 24 via a gear 23 in order to drive front driving wheels 26 and 28. The control procedures of the first embodiment are also applicable to the structure of FIG. 21.

In the above embodiments, the gasoline engine using gasoline as power is used as the engine 50. The principle of the invention is, however, applicable to any other engines, which output pulsating power.

Permanent magnet (PM)-type synchronous motors are used for the clutch motor 30 and the assist motor 40 in the power output apparatuses described above. Other motors such as variable reluctance (VR)-type synchronous motors, vernier motors, d.c. motors, induction motors, superconducting motors, and stepping motors may be used for the regenerative operation and the power operation.

The rotary transformer 38 used as means for transmitting electric power to the clutch motor 30 may be replaced by a slip ring-brush contact, a slip ring-mercury contact, a semiconductor coupling of magnetic energy, or the like.

In the above embodiments, transistor inverters are used for the first and the second driving circuits 91 and 92. Other examples applicable to the driving circuits 91 and 92 include IGBT (insulated gate bipolar mode transistor) inverters, thyristor inverters, voltage PWM (pulse width modulation) inverters, square-wave inverters (voltage inverters and current inverters), and resonance inverters.

The battery 94 may include Pb cells, NiMH cells, Li cells, or the like cells. A capacitor may be used in place of the battery 94.

Although the engine starting apparatus is mounted on the vehicle in the above embodiments, it may be mounted on other transportation means like ships and airplanes as well as a variety of industrial machines.

The scope and spirit of the present invention are limited only by the terms of the appended claims.

What is claimed is:

1. A power output apparatus comprising:

an output shaft for receiving pulsating power from an engine and being rotated by said pulsating power;

a drive shaft for transmitting power to a load;

an output shaft condition measuring device that measures conditions of said output shaft including changes in revolving speed of said output shaft and the torque being applied to said output shaft;

a clutch motor comprising a first rotor connected with said output shaft and a second rotor connected with said drive shaft, said second rotor being coaxial to and rotatable relative to said first rotor, said first and second rotors being electromagnetically connected with each other to transmit power between said output shaft and said drive shaft via the electromagnetic connection of said first and second rotors;

a clutch motor driving circuit; and a controller that sends signals to said clutch motor driving circuit and to devices for controlling operation of an engine from which said output shaft receives power, said controller causing said clutch motor driving circuit to control a degree of electromagnetic connection of said first rotor and said second rotor in said clutch motor and regulating the rotation of said second rotor relative to said first rotor, and concurrently causing said devices to control operation of said engine in order to cause said conditions of said output shaft measured by said output shaft condition measuring device to be within a predetermined range as a dead zone, said dead zone being a range within which the pulsations in power from said engine are substantially canceled.

2. A power output apparatus comprising:

an output shaft for receiving pulsating power from an engine and being rotated by said pulsating power;

a drive shaft for transmitting power to a load;

an output shaft condition measuring device that measures conditions of said output shaft including changes in revolving speed of said output shaft and the torque being applied to said output shaft;

a clutch motor comprising a first rotor connected with said output shaft and a second rotor connected with said drive shaft, said second rotor being coaxial to and rotatable relative to said first rotor, said first and second rotors being electromagnetically connected with each other to transmit power between said output shaft and said drive shaft via the electromagnetic connection of said first and second rotors;

a clutch motor driving circuit; and an assist motor comprising a stator fixed to a case, and a third rotor connected with said drive shaft, said stator being electromagnetically coupled with said third rotor;

an assist motor driving circuit; and a controller that sends signals to said clutch motor driving circuit, to said assist motor driving circuit, and to devices for controlling operation of an engine from which said output shaft receives power, said controller concurrently causing said clutch motor driving circuit to control a degree of electromagnetic connection of said first rotor and said second rotor in said clutch motor and regulating the rotation of said second rotor relative to said first rotor, and causing said assist motor driving circuit to control a degree of electromagnetic connection between said stator and said third rotor in said assist motor and regulating rotation of said third rotor relative to said stator, and causing said devices to control operation of said engine in order to enable said conditions of said output shaft measured by said output shaft condition measuring device to reach a desired, predetermined range wherein said controller measures the pulsating component of the power transmitted to said drive shaft, and sends a signal to said assist motor driving circuit to cause said assist motor to cancel the measured pulsating component.

3. The power output apparatus in accordance with claim 2, wherein the pulsating component of the power is measured based on the degree of electromagnetic connection of said first rotor and said second rotor controlled by said clutch motor driving circuit.

4. The power output apparatus in accordance with claim 2, wherein said pulsating component of the power is measured based on the conditions of said output shaft measured by said output shaft condition measuring device.

5. The power output apparatus in accordance with claim 2, wherein said assist motor driving circuit reduces the pulsating component by controlling said assist motor to enable said assist motor to add specific power to said drive shaft, the specific power having the same magnitude as that of the pulsating component of the power transmitted to said drive shaft but having a phase difference of half the cycle of the pulsating component.

6. The power output apparatus in accordance with claim 2, wherein said controller computes a frequency of the measured pulsating component of the power and sends signals to the assist motor driving circuit to successively regulate an amplitude and a phase of a sine wave power at the frequency computed to an optimal amplitude and phase for reducing said pulsating component, and enabling said assist motor to successively apply the sine wave power with the regulated amplitude and phase to said drive shaft.

7. A power output apparatus comprising:

an output shaft for receiving pulsating power from an engine and being rotated by said pulsating power;

a drive shaft for transmitting power to a load;

an output shaft condition measuring device that measures conditions of said output shaft including changes in revolving speed of said output shaft and the torque being applied to said output shaft;

a complex motor comprising a first rotor connected with said output shaft, a second rotor connected with said drive shaft being coaxial to and rotatable relative to said first rotor, and a stator for rotating said second rotor, said first rotor and said second rotor constituting a first motor, said second rotor and said stator constituting a second motor;

a first motor driving circuit;

a second motor driving circuit; and a controller that sends signals to said first and second motor driving circuits and to devices for controlling operation of an engine from which said output shaft receives power, said controller concurrently causing said first motor driving circuit to control a degree of electromagnetic connection of said first rotor and said second rotor in said first motor of said complex motor and regulating the rotation of said second rotor relative to said first rotor, and causing said second motor-driving circuit to control said second motor of said complex motor to cancel a pulsating component of the power transmitted to said drive shaft by said first motor of said complex motor in order to enable said conditions of said output shaft measured by said output shaft condition measuring device to be within a predetermined range as a dead zone, said dead zone being a range within which the pulsations in power from said engine are substantially canceled.

8. A power output apparatus comprising:

an output shaft for receiving pulsating power from an engine and being rotated by said pulsating power;

a drive shaft for transmitting power to a load;

an output shaft condition measuring device that measures conditions of said output shaft including changes in revolving speed of said output shaft and the torque being applied to said output shaft;

a complex motor comprising a first rotor connected with said output shaft, a second rotor connected with said drive shaft being coaxial to and rotatable relative to said first rotor, and a stator for rotating said second rotor, said first rotor and said second rotor constituting a first motor, said second rotor and said stator constituting a second motor;

a first motor driving circuit;

a second motor driving circuit; and a controller that sends signals to said first and second motor driving circuits and to devices for controlling operation of an engine from which said output shaft receives power, said controller concurrently causing said first motor driving circuit to control a degree of electromagnetic connection of said first rotor and said second rotor in said first motor of said complex motor and regulating the rotation of said second rotor relative to said first rotor, and causing said second motor-driving circuit to control said second motor of said complex motor to cancel a pulsating component of the power transmitted to said drive shaft by said first motor of said complex motor in order to enable said conditions of said output shaft measured by said output shaft condition measuring device to reach a target state within a predetermined range as a dead zone, said dead zone being a range within which the pulsations in power from said engine are substantially canceled.

9. A power output apparatus comprising:

an output shaft for receiving pulsating power from an engine and being rotated by said pulsating power;

a drive shaft for transmitting power to a load;

an output shaft condition measuring device that measures conditions of said output shaft including changes in revolving speed of said output shaft and the torque being applied to said output shaft;

a complex motor comprising a first rotor connected with said output shaft, a second rotor connected with said drive shaft being coaxial to and rotatable relative to said first rotor, and a stator for rotating said second rotor, said first rotor and said second rotor constituting a first motor, said first rotor and said stator constituting a second motor;

a first motor driving circuit;

a second motor driving circuit; and a controller that sends signals to said first and second motor driving circuits and to devices for controlling operation of an engine from which said output shaft receives power, said controller concurrently causing said first motor driving circuit to control a degree of electromagnetic connection of said first rotor and said second rotor in said first motor of said complex motor and regulating the rotation of said second rotor relative to said first rotor to enable said conditions of said output shaft measured by said output shaft condition measuring device to be within a predetermined range as a dead zone, said dead zone being a range within which the pulsations in power from said engine are substantially canceled, and said second motor driving circuit controlling said second motor.

* * * * *